US009986458B2

(12) United States Patent
Park et al.

(10) Patent No.: US 9,986,458 B2
(45) Date of Patent: May 29, 2018

(54) MITIGATING CONSTRAINED BACKHAUL AVAILABILITY BETWEEN A RADIO ACCESS NETWORK (RAN) AND CORE NETWORK

(71) Applicant: QUALCOMM Incorporated, San Diego, CA (US)

(72) Inventors: Edwin Chongwoo Park, San Diego, CA (US); Soumya Das, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 14/837,668

(22) Filed: Aug. 27, 2015

(65) Prior Publication Data
US 2017/0064579 A1 Mar. 2, 2017

(51) Int. Cl.
*H04W 28/02* (2009.01)
*H04L 29/08* (2006.01)
(Continued)

(52) U.S. Cl.
CPC ......... *H04W 28/0268* (2013.01); *H04L 47/14* (2013.01); *H04L 47/2408* (2013.01);
(Continued)

(58) Field of Classification Search
CPC ......... H04W 28/0257; H04W 28/0268; H04W 28/0284; H04W 28/08; H04W 36/22;
(Continued)

(56) References Cited

U.S. PATENT DOCUMENTS 6,885,638 B2 * 4/2005 Xu .............. H04L 1/1877
370/230
7,453,858 B2 * 11/2008 Csapo ............ H04W 16/00
370/232
(Continued)

FOREIGN PATENT DOCUMENTS

EP 2534777 A2 * 12/2012 ............ H04W 24/04
EP 2545741 A1 * 1/2013 .......... H04W 47/263
(Continued)

OTHER PUBLICATIONS

Li et al. (WO2016192381 A1) Processing method and device for bearer establishment and base station handover, Dec. 23, 2015, Espacenet Machine Translation.*
(Continued)

*Primary Examiner* — Eric Nowlin
(74) *Attorney, Agent, or Firm* — Holland & Hart LLP

(57) ABSTRACT

An example method may include receiving, by a computing device, control plane signaling associated with a first service to be performed by a first communication device, wherein the computing device is within a radio access network (RAN) and is in limited communication with a core network via a backhaul connection that is constrained due to a backhaul bottleneck condition. The example method may include conditionally permitting, by the computing device, a first feature of the first service based at least in part on the backhaul bottleneck condition. Another example method may include receiving, by a computing device, control plane signaling associated with a service to be performed by a first communication device, wherein the computing device is within a RAN and is in limited communication with a core network via a backhaul connection that is constrained due to a backhaul bottleneck condition.

30 Claims, 22 Drawing Sheets

(51) Int. Cl.
  *H04L 12/857* (2013.01)
  *H04L 12/851* (2013.01)
  *H04L 12/801* (2013.01)
  *H04L 12/823* (2013.01)

(52) U.S. Cl.
  CPC .......... *H04L 47/2491* (2013.01); *H04L 47/32* (2013.01); *H04L 67/2819* (2013.01); *H04L 67/322* (2013.01); *H04W 28/02* (2013.01); *H04W 28/0257* (2013.01); *H04W 28/0284* (2013.01)

(58) Field of Classification Search
  CPC ........... H04W 72/1252; H04W 76/023; H04W 76/043; H04W 28/0289; H04L 47/12; H04L 67/104; H04L 67/2819; H04L 67/322; H04L 12/1489; H04L 41/0896; H04L 47/11
  See application file for complete search history.

(56) References Cited

U.S. PATENT DOCUMENTS

| | | | | |
|---|---|---|---|---|
| 7,929,444 B2* | 4/2011 | Lin | ............ | H04L 45/00 370/235 |
| 8,103,310 B1* | 1/2012 | Srinivas | ............ | H04W 28/0247 370/329 |
| 8,416,747 B2* | 4/2013 | Bai | ............ | H04L 45/02 370/332 |
| 8,565,073 B2* | 10/2013 | Rahman | ............ | H04L 45/22 370/225 |
| 8,782,395 B1 | 7/2014 | Ly | | |
| 8,787,300 B2* | 7/2014 | Silverman | ............ | H04W 36/0055 370/330 |
| 8,804,502 B2* | 8/2014 | Henry | ............ | H04W 40/00 370/228 |
| 8,830,818 B2* | 9/2014 | Damnjanovic | ............ | H04W 36/30 370/217 |
| 8,855,056 B2* | 10/2014 | Seo | ............ | H04B 1/74 370/328 |
| 8,861,332 B2* | 10/2014 | Seo | ............ | H04W 24/04 370/216 |
| 8,908,590 B2* | 12/2014 | Seo | ............ | H04W 72/0426 370/315 |
| 8,914,027 B2* | 12/2014 | Kone | ............ | H04W 36/0055 455/423 |
| 9,078,157 B2* | 7/2015 | Chiang | ............ | H04W 24/04 |
| 9,100,869 B2* | 8/2015 | Nadas | ............ | H04L 47/263 |
| 9,119,107 B2* | 8/2015 | Timus | ............ | H04W 72/0433 |
| 9,125,080 B2* | 9/2015 | Kubota | ............ | H04W 28/0205 |
| 9,253,703 B1* | 2/2016 | Oroskar | ............ | H04W 36/30 |
| 9,432,249 B2* | 8/2016 | Fujishiro | ............ | H04W 76/046 |
| 9,474,076 B2* | 10/2016 | Fan | ............ | H04W 76/02 |
| 9,510,351 B2* | 11/2016 | Seo | ............ | H04W 72/0426 |
| 9,526,056 B2 | 12/2016 | Tomici et al. | | |
| 9,584,210 B2* | 2/2017 | Awad | ............ | H04B 7/12 |
| 9,603,104 B2* | 3/2017 | Shan | ............ | H04W 52/243 |
| 9,615,314 B2* | 4/2017 | Fong | ............ | H04W 48/12 |
| 9,642,145 B2* | 5/2017 | Roberts | ............ | H04W 72/0486 |
| 9,736,729 B1* | 8/2017 | Oroskar | ............ | H04W 28/10 |
| 2003/0231594 A1* | 12/2003 | Xu | ............ | H04L 1/1877 370/236 |
| 2004/0253984 A1* | 12/2004 | Csapo | ............ | H04W 16/00 455/561 |
| 2005/0135249 A1 | 6/2005 | Cromer et al. | | |
| 2006/0215667 A1* | 9/2006 | Lin | ............ | H04L 45/00 370/401 |
| 2006/0250953 A1* | 11/2006 | Mooney | ............ | H04L 47/10 370/229 |
| 2006/0268689 A1* | 11/2006 | Tarraf | ............ | H04L 47/10 370/229 |
| 2007/0153695 A1* | 7/2007 | Gholmieh | ............ | H04L 43/0882 370/235 |
| 2007/0177510 A1* | 8/2007 | Natarajan | ............ | H04W 36/22 370/238 |
| 2007/0280176 A1* | 12/2007 | Silverman | ............ | H04W 36/0055 370/338 |
| 2008/0031131 A1* | 2/2008 | Bordonaro | ............ | H04L 47/10 370/230 |
| 2009/0046573 A1* | 2/2009 | Damnjanovic | ............ | H04J 11/0093 370/216 |
| 2009/0147690 A1* | 6/2009 | King | ............ | H04L 45/22 370/245 |
| 2010/0190533 A1* | 7/2010 | Black | ............ | H04W 24/04 455/571 |
| 2010/0330993 A1* | 12/2010 | Kone | ............ | H04W 36/0055 455/436 |
| 2011/0151877 A1* | 6/2011 | Tafreshi | ............ | H04W 36/18 455/442 |
| 2011/0242970 A1* | 10/2011 | Prakash | ............ | H04W 76/068 370/225 |
| 2012/0011247 A1* | 1/2012 | Mallik | ............ | H04W 8/005 709/224 |
| 2012/0142336 A1* | 6/2012 | Van Phan | ............ | H04W 36/0033 455/423 |
| 2012/0294225 A1* | 11/2012 | Awad | ............ | H04B 7/12 370/315 |
| 2012/0307770 A1* | 12/2012 | Kubota | ............ | H04W 28/0205 370/329 |
| 2012/0314567 A1* | 12/2012 | Seo | ............ | H04W 24/04 370/228 |
| 2012/0320746 A1* | 12/2012 | Nadas | ............ | H04W 28/10 370/230 |
| 2012/0327801 A1* | 12/2012 | Seo | ............ | H04B 1/74 370/252 |
| 2013/0003534 A1* | 1/2013 | Henry | ............ | H04W 40/00 370/228 |
| 2013/0073671 A1* | 3/2013 | Nagpal | ............ | H04W 76/023 709/217 |
| 2013/0171975 A1* | 7/2013 | Lindner | ............ | H04L 65/1083 455/412.1 |
| 2013/0182555 A1* | 7/2013 | Raaf | ............ | H04W 36/0033 370/216 |
| 2013/0198558 A1 | 8/2013 | Rao et al. | | |
| 2013/0258945 A1* | 10/2013 | Tomita | ............ | H04W 76/045 370/328 |
| 2013/0287012 A1* | 10/2013 | Pragada | ............ | H04W 76/045 370/338 |
| 2013/0310052 A1* | 11/2013 | Timus | ............ | H04W 72/0433 455/445 |
| 2013/0322413 A1* | 12/2013 | Pelletier | ............ | H04W 72/1289 370/336 |
| 2013/0336195 A1* | 12/2013 | Seo | ............ | H04W 72/0426 370/315 |
| 2014/0010108 A1* | 1/2014 | Tavildar | ............ | H04W 8/005 370/254 |
| 2014/0064083 A1* | 3/2014 | Ray | ............ | H04W 36/22 370/235 |
| 2014/0066006 A1* | 3/2014 | Ray | ............ | H04W 28/0247 455/406 |
| 2014/0073317 A1* | 3/2014 | Zhou | ............ | H04W 28/0205 455/424 |
| 2014/0079218 A1* | 3/2014 | Cheng | ............ | H04W 12/02 380/270 |
| 2014/0092731 A1* | 4/2014 | Gupta | ............ | H04W 52/0258 370/229 |
| 2014/0105174 A1 | 4/2014 | Agrawal et al. | | |
| 2014/0187236 A1* | 7/2014 | Chiang | ............ | H04W 24/04 455/423 |
| 2014/0204834 A1* | 7/2014 | Singh | ............ | H04W 40/22 370/315 |
| 2014/0213186 A1* | 7/2014 | Gage | ............ | H04W 4/023 455/41.2 |
| 2014/0235261 A1* | 8/2014 | Fan | ............ | H04W 76/02 455/452.1 |
| 2014/0259109 A1 | 9/2014 | Houston et al. | | |
| 2014/0297822 A1 | 10/2014 | Agrawal et al. | | |
| 2014/0307542 A1* | 10/2014 | Fujishiro | ............ | H04W 76/046 370/225 |

(56) References Cited

U.S. PATENT DOCUMENTS

| | | | |
|---|---|---|---|
| 2014/0335877 A1* | 11/2014 | Roberts | H04W 72/0486 455/452.1 |
| 2015/0055548 A1* | 2/2015 | Seo | H04W 72/0426 370/315 |
| 2015/0117207 A1* | 4/2015 | Radulescu | H04L 43/10 370/235 |
| 2015/0119046 A1* | 4/2015 | Radulescu | H04L 43/10 455/438 |
| 2015/0201352 A1* | 7/2015 | Shan | H04W 52/243 370/235 |
| 2015/0230275 A1* | 8/2015 | Kerpez | H04L 12/66 370/329 |
| 2015/0365854 A1* | 12/2015 | Bai | H04W 36/0055 370/217 |
| 2015/0365959 A1* | 12/2015 | Coldrey | H04W 24/04 370/252 |
| 2016/0014030 A1* | 1/2016 | Thyni | H04L 47/11 370/237 |
| 2016/0044737 A1* | 2/2016 | Kwon | H04W 76/046 370/328 |
| 2016/0050585 A1* | 2/2016 | Shan | H04B 7/0456 370/235 |
| 2016/0050615 A1* | 2/2016 | Fong | H04W 48/12 455/411 |
| 2016/0100355 A1* | 4/2016 | Chen | H04W 8/005 370/232 |
| 2016/0212780 A1* | 7/2016 | Stojanovski | H04W 8/005 |
| 2016/0269936 A1* | 9/2016 | Watanabe | H04W 28/08 |
| 2016/0285537 A1* | 9/2016 | Maaref | H04B 7/14 |
| 2016/0366614 A1* | 12/2016 | Hessler | H04W 28/0268 |
| 2016/0381585 A1* | 12/2016 | Dudzinski | F16M 11/06 370/252 |
| 2017/0026885 A1* | 1/2017 | Panigrahi | H04W 36/22 |
| 2017/0034718 A1* | 2/2017 | Fan | H04W 76/02 |
| 2017/0064710 A1* | 3/2017 | Seo | H04W 72/0426 |
| 2017/0099617 A1* | 4/2017 | Tomici | H04W 28/08 |
| 2017/0117951 A1* | 4/2017 | Awad | H04B 7/12 |
| 2017/0164269 A1* | 6/2017 | Fong | H04W 48/12 |
| 2017/0164419 A1* | 6/2017 | Kim | H04W 76/028 |
| 2017/0208574 A1* | 7/2017 | Ramakrishna | H04L 5/0055 |
| 2017/0230781 A1* | 8/2017 | Luo | H04W 4/005 |
| 2017/0230880 A1* | 8/2017 | Oroskar | H04W 36/22 |
| 2017/0237625 A1* | 8/2017 | Zhang | H04L 41/12 370/254 |

FOREIGN PATENT DOCUMENTS

| | | | | |
|---|---|---|---|---|
| EP | 2571310 A1 | * | 3/2013 | H04W 28/08 |
| EP | 2545741 A4 | * | 2/2017 | H04L 47/263 |
| KR | 20130007551 A | * | 1/2013 | H04W 24/04 |
| WO | WO 2011099802 A2 | * | 8/2011 | H04W 24/04 |
| WO | WO 2011112124 A1 | * | 9/2011 | H04L 47/263 |
| WO | WO 2011099802 A3 | * | 1/2012 | H04W 24/04 |
| WO | WO-2013006769 A1 | | 1/2013 | |
| WO | WO-2013068335 A1 | | 5/2013 | |
| WO | WO 2016192381 A1 | * | 12/2016 | H04W 48/02 |

OTHER PUBLICATIONS

ISA/EP, International Search Report and Written Opinion of the International Searching Authority, Int'l Application No. PCT/US2016/044152, dated Oct. 26, 2016, European Patent Office, Rijswijk, NL, 15 pgs.

* cited by examiner

MITIGATING CONSTRAINED BACKHAUL AVAILABILITY BETWEEN A RADIO ACCESS NETWORK (RAN) AND CORE NETWORK

BACKGROUND

The following relates generally to wireless communication, and more specifically to mitigating constrained backhaul availability between a radio access network (RAN) and core network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Many wireless communications systems generally realize little or no constraints with respect to backhaul capacity. In such cases, the backhaul capacity is readily available to the core network, and constraints regarding wireless operations may exist more on the air interface (e.g., the wireless link between a mobile device and a base station/cell site). However, in certain cases the air interface capabilities may exceed the backhaul bandwidth that is provisioned and available to support wireless communications functionality.

SUMMARY

Systems, methods, and devices for mitigating constrained backhaul availability between a radio access network (RAN) and core network are described. In some examples, a computing device (e.g., an edge computing device) may receive control plane signaling associated with a first service to be performed by a first communication device (e.g., a mobile or wireless communication device). The computing device may be within a RAN (e.g., physically and/or logically located within the RAN) and may be in limited communication with a core network via a backhaul connection that may be constrained due to a backhaul bottleneck condition. The computing device may conditionally permit a first feature of the first service based at least in part on the backhaul bottleneck condition. In other examples, a computing device may receive control plane signaling associated with a service to be performed by a first communication device (e.g., a mobile or wireless communication device). The computing device may be within a RAN (e.g., physically and/or logically located within the RAN) and may be in limited communication with a core network via a backhaul connection that may be constrained due to a backhaul bottleneck condition. The computing device may perform at least some core network control plane functions associated with the service based at least in part on the backhaul bottleneck condition.

A method of wireless communication is described. The method may include receiving, by a computing device, control plane signaling associated with a first service to be performed by a first communication device, wherein the computing device is within a RAN and is in limited communication with a core network via a backhaul connection that is constrained due to a backhaul bottleneck condition, and conditionally permitting, by the computing device, a first feature of the first service based at least in part on the backhaul bottleneck condition.

An apparatus for wireless communication is described. The apparatus may include a processor, memory in electronic communication with the processor, and instructions stored in the memory and operable, when executed by the processor, to cause the apparatus to receive control plane signaling associated with a first service to be performed by a first communication device, wherein the apparatus is within a RAN and is in limited communication with a core network via a backhaul connection that is constrained due to a backhaul bottleneck condition, and conditionally permit a first feature of the first service based at least in part on the backhaul bottleneck condition.

An further apparatus for wireless communication is described. The apparatus may include means for receiving control plane signaling associated with a first service to be performed by a first communication device, wherein the apparatus is within a RAN and is in limited communication with a core network via a backhaul connection that is constrained due to a backhaul bottleneck condition, and means for conditionally permitting a first feature of the first service based at least in part on the backhaul bottleneck condition.

A non-transitory computer-readable medium storing code for wireless communication is described. The code may include instructions executable by a computing device to receive control plane signaling associated with a first service to be performed by a first communication device, wherein the computing device is configured to be within a RAN and is adapted for limited communication with a core network via a backhaul connection that is constrained due to a backhaul bottleneck condition, and conditionally permit a first feature of the first service based at least in part on the backhaul bottleneck condition.

Some examples of the method, apparatuses, or non-transitory computer-readable medium described herein may further include processes, features, means, or instructions for conditionally permitting the first feature of the first service without verifying, via the backhaul connection, the first feature with respect to the first communication device. Additionally or alternatively, some examples may include processes, features, means, or instructions for assigning, by the computing device, a first permission level associated with the first service and the first communication device.

Some examples of the method, apparatuses, or non-transitory computer-readable medium described herein may further include processes, features, means, or instructions for assigning, by the computing device, a first quality of service (QoS) metric for data transmission external to the RAN associated with the first feature of the first service. Additionally or alternatively, some examples may include processes, features, means, or instructions for delaying, by the computing device, data transmission external to the RAN based at least in part on a predefined amount of data buffered by the computing device or a predefined time period for transmission.

Some examples of the method, apparatuses, or non-transitory computer-readable medium described herein may further include processes, features, means, or instructions for receiving, by the computing device, control plane signaling associated with the first service to be performed by a second communication device, and transmitting, by the computing device, a request to the first communication device to conditionally permit the first feature of the first service to be performed by the second communication device. Additionally or alternatively, some examples may include processes, features, means, or instructions for establishing a delay tolerant bearer channel using the backhaul connection for data transmission external to the RAN.

Some examples of the method, apparatuses, or non-transitory computer-readable medium described herein may further include processes, features, means, or instructions for receiving, by the computing device, control plane signaling associated with a second service to be performed by a second communication device, conditionally permitting, by the computing device, a second feature of the second service without verifying the second feature with respect to the second communication device via the backhaul connection, and establishing an aggregate bearer channel using the backhaul connection for data transmission external to the RAN associated with the first service and the second service. Additionally or alternatively, some examples may include processes, features, means, or instructions for initiating data transmission via the aggregate bearer channel based at least in part on detection of data for transmission by both the first communication device and the second communication device.

Some examples of the method, apparatuses, or non-transitory computer-readable medium described herein may further include processes, features, means, or instructions for assigning, by the computing device, a first permission level associated with the first service and the first communication device, communicating, via the backhaul connection, with a server to verify the first feature of the first service with respect to the first communication device after conditionally permitting the first feature, and assigning, by the computing device, a second permission level associated with the first service and the first communication device based at least in part on a result of verifying the first feature with respect to the first communication device.

Additionally or alternatively, some examples may include processes, features, means, or instructions for assigning, by the computing device, a first QoS metric for data transmission external to the RAN associated with the first feature of the service, and assigning, by the computing device, a second QoS metric for data transmission internal to the RAN associated with the first feature of the service, the second QoS metric being different from the first QoS metric. In some examples of the method, apparatuses, or non-transitory computer-readable medium described herein, the first QoS metric is defined by a best-effort delivery attempt to transmit a data packet. Additionally or alternatively, some examples may include processes, features, means, or instructions for transmitting a transmission canceled message to the first communication device associated with the first QoS metric based at least in part on non-transmission of the data packet after a time period.

In some examples of the method, apparatuses, or non-transitory computer-readable medium described herein, the backhaul bottleneck condition is a condition relating to non-contiguous availability of the backhaul network connection such that connectivity provided to the RAN via the backhaul connection is purposefully disconnected. Additionally or alternatively, in some examples the first service is a local content hosting service and the first feature is data transmission associated with a local content host server.

An additional method of wireless communication is described. The method may include receiving, by a computing device, control plane signaling associated with a service to be performed by a first communication device, wherein the computing device is within a RAN and is in limited communication with a core network via a backhaul connection that is constrained due to a backhaul bottleneck condition, and performing, by the computing device, at least some core network control plane functions associated with the service, based at least in part on the backhaul bottleneck condition.

An apparatus for wireless communication is described. The apparatus may include a processor, memory in electronic communication with the processor, and instructions stored in the memory and operable, when executed by the processor, to cause the apparatus to receive control plane signaling associated with a service to be performed by a first communication device, wherein the apparatus is within a RAN and is in limited communication with a core network via a backhaul connection that is constrained due to a backhaul bottleneck condition, and perform at least some core network control plane functions associated with the service, based at least in part on the backhaul bottleneck condition An further apparatus for wireless communication is described. The apparatus may include means for receiving control plane signaling associated with a service to be performed by a first communication device, wherein the apparatus is within a RAN and is in limited communication with a core network via a backhaul connection that is constrained due to a backhaul bottleneck condition, and means for performing at least some core network control plane functions associated with the service, based at least in part on the backhaul bottleneck condition.

A non-transitory computer-readable medium storing code for wireless communication is described. The code may include instructions executable by a computing device to receive control plane signaling associated with a service to be performed by a first communication device, wherein the computing device is configured to be within a RAN and is adapted for limited communication with a core network via a backhaul connection that is constrained due to a backhaul bottleneck condition, and perform at least some core network control plane functions associated with the service, based at least in part on the backhaul bottleneck condition.

Some examples of the method, apparatuses, or non-transitory computer-readable medium described herein may further include processes, features, means, or instructions for transmitting at least some of the control plane signaling associated with the service to a core network server via the backhaul connection. Additionally or alternatively, some examples may include processes, features, means, or instructions for performing at least some core network control plane functions associated with the service comprises performing, by the computing device, a non-access stratum (NAS) function associated with the service.

Some examples of the method, apparatuses, or non-transitory computer-readable medium described herein may further include processes, features, means, or instructions for performing, by the computing device, a mobility management support function associated with the service. Additionally or alternatively, some examples may include processes, features, means, or instructions for performing, by the computing device, a policy control and charging rules function (PCRF) process associated with the service.

Some examples of the method, apparatuses, or non-transitory computer-readable medium described herein may further include processes, features, means, or instructions for performing, by the computing device, a proxy function associated with a request by the first communications device. Additionally or alternatively, some examples may include processes, features, means, or instructions for initiating, by the computing device, the request associated with the service on behalf of the first communication device.

Some examples of the method, apparatuses, or non-transitory computer-readable medium described herein may further include processes, features, means, or instructions for terminating a first protocol connection between the first communication device and the computing device, and terminating a second protocol connection between the computing device and a server associated with the service. Additionally or alternatively, in some examples the backhaul connection comprises a satellite link and the backhaul bottleneck condition comprises temporal availability of the satellite link for communication with the computing device.

In some examples of the method, apparatuses, or non-transitory computer-readable medium described herein, the service is a voice over Internet protocol (VoIP) service.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

Figure 1:
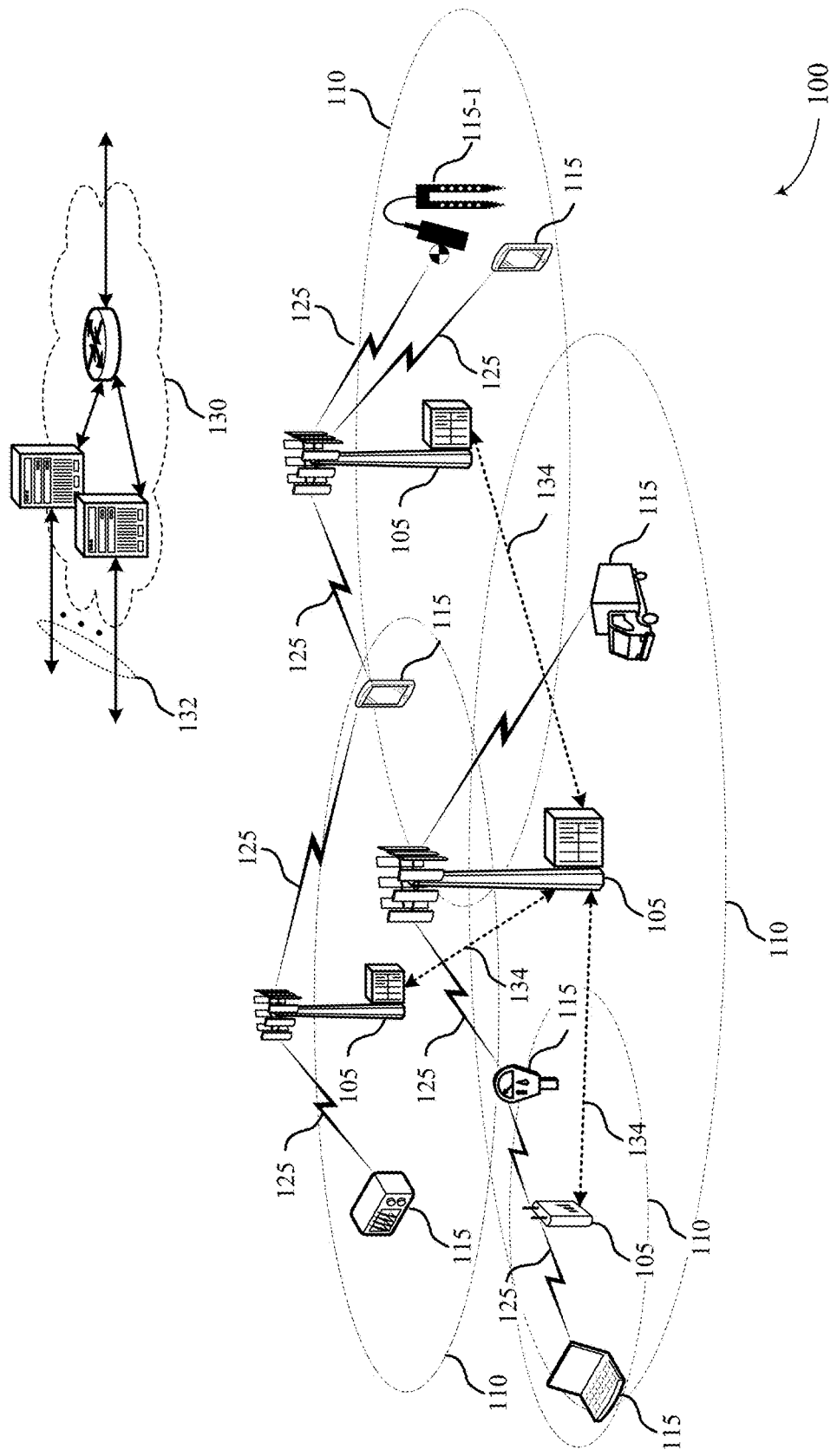
FIG. 1 illustrates an example of a wireless communications system that supports mitigating constrained backhaul availability between a radio access network (RAN) and core network in accordance with various aspects of the present disclosure.

Improvements in spectral efficiency and data rates (e.g., higher order modulation (HOM) techniques, multiple input and multiple output (MIMO) spatial multiplexing, carrier aggregation (CA)/channel bonding, etc.) have been achieved for small cells and Wi-Fi access points in some wireless communications systems. In certain cases, the air interface capabilities and available capacity may exceed the backhaul network connectivity that is provisioned and available to support wireless network functionality. Additionally, in certain operational scenarios, voice and data bearer traffic may be substantially contained within a particular cell or set of cells such that associated access to the core network may become a limiting factor. For example, a wireless communications service may be characterized by data usage inside the network (e.g., between nodes or devices within the radio access network (RAN)) exceeding the connectivity requirements to outside or external network elements. In another example, emerging market communities may exhibit wireless communications service traffic patterns and characteristics in which intra-community voice and data traffic substantially exceed inter-community voice and data traffic. Moreover, external connectivity associated with wireless communications systems in such emerging market communities may be limited, expensive, and/or intermittently available. Another example in which access to the core network may become a limiting factor is a private network where data created, acquired, and/or utilized within the coverage of one or more serving cells or base stations exceeds that data capabilities and requirements outside the private network.

As such, backhaul facilities may either be less capable or less available thereby resulting in operational implications and constraints to a particular service of a wireless communications system. In accordance with some aspects of the present disclosure, control plane and core functionality that would typically require the use of backhaul connectivity (e.g., functionality that is typically performed by one or more servers in a core network of a Long Term Evolution (LTE)/LTE-Advanced (LTE-A) network) may be delayed until a later time. For example, authentication of a service to be used by a first communication device that would typically require immediate authentication or verification may be conditionally permitted by a computing device (e.g., an edge computing device such as, but not limited to, a computing device in communication with or integrated with one or more small cells or base stations within a RAN) prior to formal authentication procedures, whereby the formal authentication procedures require the use of a backhaul connection to a core network of a wireless communications system. In some cases, the later time at which control plane and core functionality requiring the use of backhaul connectivity (e.g., formal authentication of the service via backhaul facilities to a core network) can correspond to a particular transmission time slot (e.g., off-peak time slot). In other cases, the later time at which control plane and core functionality requiring the use of backhaul connectivity can correspond to a time when certain conditions are met. For example, transmission of data over a backhaul connection for formal authentication may be delayed until the edge computing device determines that the backhaul connection meets a particular percentage or utilization level.

Additionally or alternatively, control plane and core functionality (e.g., functionality that is typically performed by one or more servers in a core network of an LTE/LTE-A network) may be moved to an edge computing device (e.g., a computing device in communication with or integrated with one or more small cells or base stations within a RAN). For example, functions such as, but not limited to, authentication, subscription profile verification/home subscriber server (HSS) processes, security processes, mobility management support functions, tracking/paging functions, bearer activation/deactivation processes, policy control and charging rules function (PCRF) processes, etc. may be performed by the edge computing device. In some examples, application data and processing activities may be performed by the edge computing device (e.g., processes may be temporarily cached or control plane/core functionality edge architecture redesign). For example, data synchronization (in relation to different layers and various elements or objects of a data structure or database system) may be delayed until a later time. Certain device management (DM) functions may also be performed by the edge computing device.

Aspects of the disclosure are initially described in the context of a wireless communications system. These and other aspects of the disclosure are further illustrated by and described with reference to apparatus diagrams, system diagrams, and flowcharts that relate to mitigating constrained backhaul availability between a radio access network (RAN) and core network.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be an LTE/LTE-A network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly (e.g., without communication through core network 130) or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some aspects, a base station 105 may be an edge computing device and/or may include the functionality of an edge computing device. In some aspects, an edge computing device may be in communication with or integrated with a cell (e.g., a base station 105, NodeB, or eNB). In this regard, the edge computing device (or functionality thereof) may be disposed between a plurality of UEs 115 and backhaul links 132 for interfacing with the core network 130.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplex (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical HARQ indicator channel (PHICH) configuration. After decoding the MIB, the UE 115 may receive one or more system information block (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, SRS, and cell barring.

After completing initial cell synchronization, a UE 115 may decode the MIB, SIB1 and SIB2 prior to accessing the network. The MIB may be transmitted on PBCH and may utilize the first 4 orthogonal frequency division multiple access (OFDMA) symbols of the second slot of the first subframe of each radio frame. It may use the middle 6 resource block (RBs) (72 subcarriers) in the frequency domain. The MIB carries a few important pieces of information for UE initial access, including: DL channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code. After reading a MIB (either a new version or a copy), the UE 115 may can try different phases of a scrambling code until it gets a successful cyclic redundancy check (CRC) check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

After the UE 115 decodes SIB2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an UL resource grant, a timing advance and a temporary cell radio network temporary identity (C-RNTI). The UE 115 may then transmit an RRC connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new cell radio network temporary identity (C-RNTI). If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

Hybrid automatic repeat request (HARQ) may be a method of ensuring that data is received correctly over a wireless communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

The physical downlink control channel (PDCCH) carries downlink control information (DCI) in control channel elements (CCEs), which may consist of nine logically contiguous resource element groups (REGs), where each REG contains 4 resource elements (REs). DCI includes information regarding DL scheduling assignments, uplink (UL) resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

PUCCH may be used for UL acknowledgements (ACKs), scheduling requests (SRs) and channel quality indicators (CQI) and other UL control information. A PUCCH may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through RRC signaling. In some cases, resources for SR may be assigned after acquiring synchronization through a RACH procedure. In other cases, an SR may not be assigned to a UE 115 through the RACH (i.e., synchronized UEs may or may not have a dedicated SR channel). PUCCH resources for SR and CQI may be lost when the UE is no longer synchronized.

Wireless communications system 100 may include a radio link control (RLC) layer that connects higher layers (e.g., RRC and packet data convergence protocol (PDCP)) to the lower layers (e.g., the MAC layer). An RLC entity in a base station 105 or a UE 115 may ensure that transmission packets are organized into appropriately sized blocks (corresponding to the MAC layer transport block size). If an incoming data packet (i.e., a PDCP or RRC service data unit (SDU)) is too big for transmission, the RLC layer may segment it into several smaller RLC protocol data unit (PDUs). If the incoming packets are too small, the RLC layer may concatenate several of them into a single, larger RLC PDU. Each RLC PDU may include a header including information about how to reassemble the data. The RLC layer may also ensure that packets are reliably transmitted. The transmitter may keep a buffer of indexed RLC PDUs, and continue retransmission of each PDU until it receives the corresponding acknowledgement (ACK). In some cases, the transmitter may send a Poll Request to determine which PDUs have been received and the receiver may respond with a Status Report. Unlike the MAC layer HARQ, RLC automatic repeat request (ARQ) may not include a forward error correction function. An RLC entity may operate in one of three modes. In acknowledged mode (AM), unacknowledged mode (UM) and TM. In AM, the RLC entity may perform segmentation/concatenation and ARQ. This mode may be appropriate for delay tolerant or error sensitive transmissions. In UM, the RLC entity may perform segmentation/concatenation but not ARQ. This may be appropriate for delay sensitive or error tolerant traffic (e.g., voice over Long Term evolution (VoLTE)). transparent mode (TM) only performs data buffering, and does not include either concatenation/segmentation or ARQ. TM may be used primarily for sending broadcast control information (e.g., the MIB and SIBs), paging messages, and RRC connection messages. Some transmissions may be sent without RLC (e.g., a RACH preamble and response).

Time intervals in Long Term Evolution (LTE) may be expressed in multiples of a basic time unit (e.g., the sampling period, Ts=1/30,720,000 seconds). Time resources may be organized according to radio frames of length of 10 ms (Tf=307200·Ts), which may be identified by an SFN ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

In some cases, wireless communication system 100 may utilize coverage enhancement (CE) techniques to improve the quality of a communications link 125 for UEs 115 located at a cell edge, operating with low power transceivers, or experiencing high interference or path loss. CE techniques may include repeated transmissions, TTI bundling, HARQ retransmission, PUSCH hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a NACK before retransmitting redundancy versions. This may be effective for users engaging in VoLTE or VOIP communications. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.).

In some cases LTE networks may be designed for transfer of data packets, and may use a circuit switched fall back for voice communications. However, an LTE network may also be used for voice communications using a packet based system similar to voice over internet protocol (VoIP) applications. This may be accomplished using VoLTE technology. There may be several key differences between VoLTE and VoIP. For example, VoLTE service may include an explicit quality of service (QoS) target. To achieve the QoS threshold in poor radio conditions, VoLTE packets may utilize internet protocol (IP) multimedia subsystem (IMS) and other network features to ensure low latency and improved error correction.

In some cases, wireless communication system 100 may include both packet switched (PS) network components for data transfer and circuit switched (CS) fall back components for voice communications. For example, some base stations 105 may be configured for PS operation and other base stations 105 may be configured for CS operation. In some cases, the CS network components may be legacy network components such as first generation (1X) wireless network components. Additionally, a UE 115 may have a voice centric usage setting which prompts it to seek out a circuit switched fall back (CSFB) connection for exchange of voice data. If a voice centric UE 115 is unable to establish a CS connection it may disconnect from wireless communications system 100. In some cases, a UE 115 may also have a data centric usage setting which may prompt the UE 115 to remain connected regardless of whether a CSFB is available.

A base station 105 may insert periodic pilot symbols such as cell-specific reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating channel state information (CSI). On the UL, a UE 115 may transmit a combination of periodic sounding reference signal (SRS) and UL DMRS for link adaptation and demodulation, respectively.

Wireless communications system 100 may include a PDCP layer at a UE 115 and at a base station 105. The PDCP layer may be responsible for header compression and decompression of internet protocol (IP) data flows using the robust header compression (ROHC) protocol, transfer of data (user plane or control plane), maintenance of PDCP sequence numbers SNs, and in-sequence delivery of upper layer PDUs to lower layers. The PDCP layer may also manage elimination of duplicate packets, ciphering and deciphering of user plane data and control plane data, integrity protection and integrity verification of control plane data, and packet discard based on a timer-out timer.

A UE 115 may coordinate transmit power with a serving base station to mitigate interference, improve the UL data rate, and prolong battery life. Uplink power control may include a combination of open-loop and closed-loop mechanisms. In open-loop power control the UE transmit power depends on estimates of the downlink path-loss and channel configuration. In closed-loop power control that the network can directly control the UE transmit power using explicit power-control commands. Open-loop power control may be used for initial access, whereas both open and closed loop control may be used for UL control and data transmission. A UE 115 may determine power using an algorithm that takes into account a maximum transmission power limit, a target base station receive power, path loss, modulation and coding scheme (MCS), the number of resources used for transmission, and the format of the transmitted data (e.g., PUCCH) format). Power adjustments may be made by a base station 105 using a transmit power command (TPC) messages, which may incrementally adjust the transmit power of a UE 115 as appropriate.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, transaction-based business charging, and soil moisture, conductivity, and pH monitoring (an example MTC device of which is shown as UE 115-1 in FIG. 1). An MTC device may operate using half-duplex (one-way) communications at a reduced peak rate. MTC devices may also be configured to enter a power saving "deep sleep" mode when not engaging in active communications.

Figure 2A:
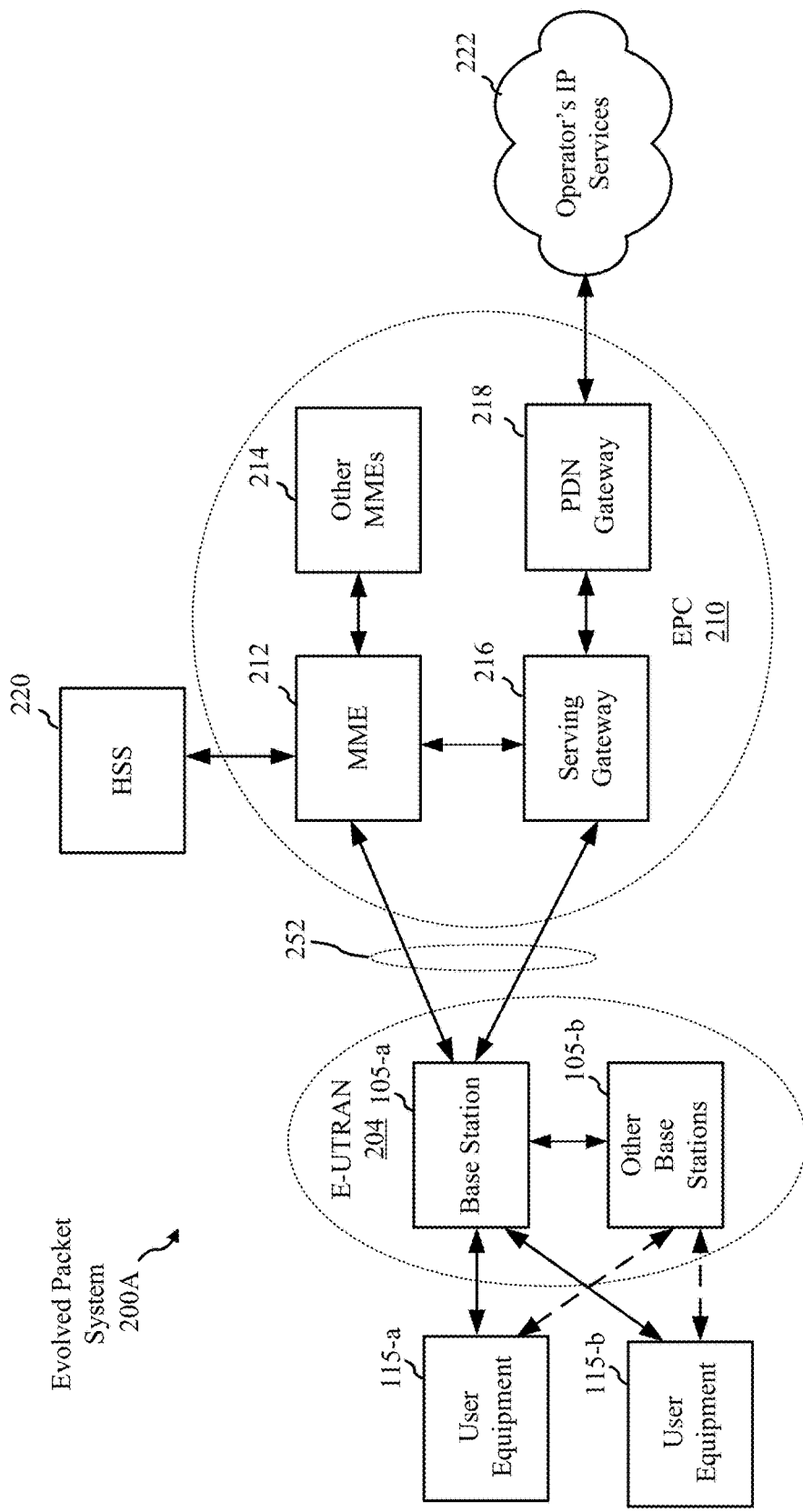
FIG. 2A illustrates an example of a network architecture in a wireless communications system that supports mitigating constrained backhaul availability between a RAN and core network in accordance with various aspects of the present disclosure.

FIG. 2A illustrates an example of a network architecture in a wireless communication system for mitigating constrained backhaul availability between a RAN and core network in accordance with various aspects of the present disclosure. The LTE/LTE-A network architecture 200a may be referred to as an Evolved Packet System (EPS) 200a. The EPS 200a may include devices 115-a and 115-b and base stations 105-a and 105-b, which may be examples of a UE 115 and base station 105 described with reference to FIG. 1.

The EPS 200a may include a RAN 204 such as an Evolved UMTS Terrestrial Radio Access Network (E-UTRAN), a core network 210 such as an Evolved Packet Core (EPC), a Home Subscriber Server (HSS) 220, and an Operator's IP Services 222. The EPS 200a may interconnect with other access networks, but for simplicity those entities/interfaces are not shown. As shown, the EPS 200a provides packet-switched services, however, as those skilled in the art will readily appreciate, the various concepts presented throughout this disclosure may be extended to networks providing circuit-switched services.

The RAN 204 may include a base station 105-a and other base stations 105-b. For example, base station 105-a may be an edge computing device and/or may include the functionality of an edge computing device. An edge computing device may be one of in communication with or integrated with base station 105-a in some examples. The base station 105-a may provide user and control plane protocol terminations toward device 115-a and device 115-b. The base station 105-a may be connected to other base stations 105-b via an X2 interface, for example. The base station 105-a may provide an access point to the core network 210 for device 115-a and device 115-b. Examples of device 115-a and device 115-b include, but are not limited to, cellular phones, smart phones, session initiation protocol (SIP) phones, laptops, personal digital assistants (PDAs), satellite radios, global positioning systems, multimedia devices, video devices, digital audio players (e.g., MP3 player), cameras, game consoles, MTC devices, or other similar functioning devices.

The base station 105-a may be connected by an S1 interface to the core network 210. The S1 interface may be a backhaul connection 252 that is constrained due to a backhaul bottleneck condition. For example, the core network 210 may include a Mobility Management Entity (MME) 212, other MMEs 214, a Serving Gateway 216, and a Packet Data Network (PDN) Gateway 218. The MME 212 may be the control node that processes the signaling between the device 115-a (as well as device 115-b) and the core network 210. Generally, the MME 212 may provide bearer and connection management. All user IP packets may be transferred through the Serving Gateway 216, which itself may be connected to the PDN Gateway 218. The PDN Gateway 218 may provide UE IP address allocation as well as other functions. The PDN Gateway 218 may be connected to the Operator's IP Services 222. The Operator's IP Services 222 may include the Internet, the Intranet, an IP Multimedia Subsystem (IMS), and a Packet-Switched (PS) Streaming Service (PSS).

The device 115-a and device 115-b may be configured to collaboratively communicate with multiple base stations 105 through, for example, Multiple Input Multiple Output (MIMO), Coordinate Multi-Point (CoMP), or other schemes. Nonetheless, the device 115-a and device 115-b may also receive unwanted interference signals from one or more of the other base stations 105-b. These interference signals may reduce the signal quality of other transmissions received by the device 115-a and device 115-b. As such, the device 115-a and device 115-b may estimate the interference signals received, generate an interference cancellation signal based on the estimate, and apply the interference cancellation signal to input data from the receiver to substantially remove the interference signals from the input data and improve the integrity of the input data.

As described above, in certain examples, the source of the interference may use a transmission diversity scheme in which the same interference signal is transmitted redundantly over different channels. In such examples, the device 115-a and device 115-b may receive versions of the interference signal on the different channels and recognize that they are the product of transmission diversity from the interference source. The device 115-a and device 115-b may then combine the received versions of the interference signal to generate its estimate of the interference signal. Thus, the estimate of the interference signal produced by combining the different received versions of the signal may be more accurate than individual estimates of the individually received versions taken separately. This estimate may be the basis of a more accurate interference cancellation signal, which may more accurately cancel the received interference signals at the device 115-a and device 115-b.

In some examples, base station 105-a may receive control plane signaling associated with a service (e.g., VoLTE) to be performed by device 115-a. The base station 105-a may be in limited communication with core network 210 via backhaul connection 252 that may be constrained due to a backhaul bottleneck condition. The backhaul bottleneck condition may be related to cost and/or power (e.g., bandwidth for the backhaul connection 252 may be available, but may be expensive). In some cases, the backhaul bottleneck condition may be related to intermittent connectivity (e.g., shared use or bandwidth of network facilities associated with the backhaul connection 252, or physical transfer of data via storage drive associated with the backhaul connection 252). In some implementations, backhaul connection 252 may be a one or more phone lines (e.g., plain old telephone service (POTS) lines). The base station 105-a may conditionally permit a feature of the service (e.g., intra-cell based voice calling such that device 115-a may call device 115-b) based least in part on the backhaul bottleneck condition. However, if UE 115-a attempts to call a mobile phone utilizing the Operator's IP Services 222 via the backhaul connection 252, for example, base station 105-a may deny the call attempt based at least in part on the backhaul bottleneck condition.

In some examples, base station 105-a may receive control plane signaling associated with a service (e.g., VoLTE) to be performed by device 115-a. The base station 105-a may be in limited communication with core network 210 via backhaul connection 252 that may be constrained due to a backhaul bottleneck condition. The base station 105-a may perform at least some core network control plane functions associated with the service (e.g. authentication of the VoLTE service) based at least in part on the backhaul bottleneck condition. For example, base station 105-a may include an subscriber data table that is updated periodically (e.g., once every day or week) with a similar subscriber data table managed by the HSS 220. The base station 105-a may determine that device 115-a is not authorized to make voice calls based information (or lack thereof) regarding UE 115-a contained in the local subscriber data table. As such, the base station 105-a can make such a determination without performing an authentication process with the core network 210 and HSS 220 via the backhaul connection 252.

Figure 2B:
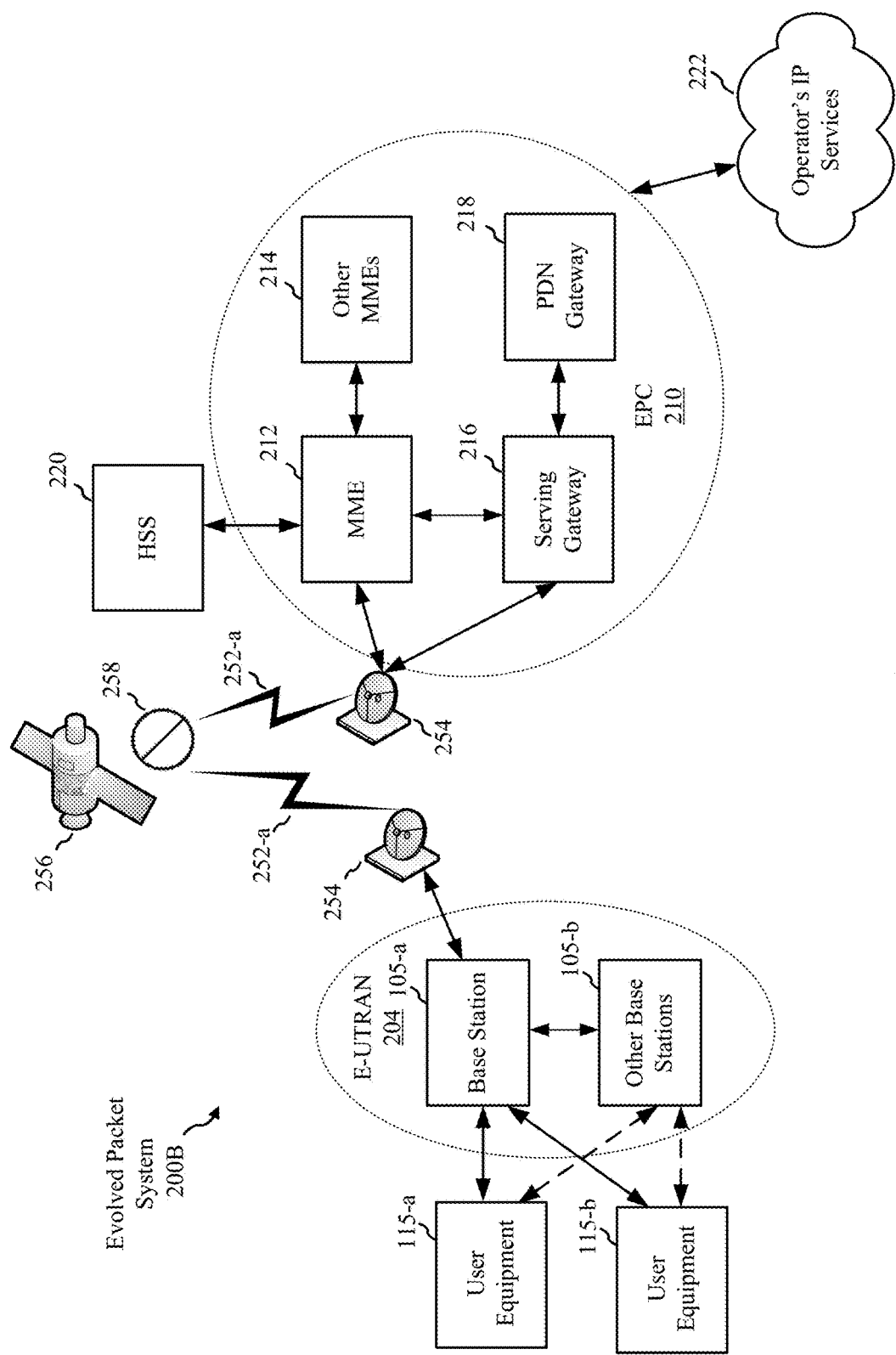
FIG. 2B illustrates an example of a network architecture in a wireless communications system that supports mitigating constrained backhaul availability between a RAN and core network in accordance with various aspects of the present disclosure.

FIG. 2B illustrates an example of a network architecture in a wireless communication system for mitigating constrained backhaul availability between a RAN and core network in accordance with various aspects of the present disclosure. The LTE/LTE-A network architecture 200b may be referred to as an Evolved Packet System (EPS) 200b. The EPS 200b may include devices 115-a and 115-b and base stations 105-a and 105-b, which may be examples of a UE 115 and base station 105 described with reference to FIG. 1. The EPS 200b may include similar elements as the EPS 200a described with respect to FIG. 2A.

The backhaul connection 252-a of the EPS 200b may be a satellite link. The satellite link may be provided by a satellite 254 in communication with the base station 105-a and a satellite 254 in communication with the core network 210. The satellites 254 may communicate via a geosynchronous satellite 256. The backhaul bottleneck condition may be a condition relating to non-contiguous availability of the backhaul connection 252-a (e.g., unavailability of the backhaul connection 252-a for more than times during routine or scheduled maintenance and/or unplanned outages). For example, the backhaul connection 252-a provided to the RAN 204 via the satellite link may be purposefully disconnected 258. In this regard, the E-UTRAN 204 can be seen as a figurative 'island' for which communication is limited with the core network 210 in some manner.

In some examples, when the other base stations 105-b have direct backhaul connections 252 to the core network 210, the base station 105-a and the other base stations 105-b can be used to exchange data transmission such that data can be relayed across the cells on the figurative island (e.g., commercial ship, merchant vessel, airplane, remote geographical location, private or semi-private campus or business park networks, etc.) if one of the base stations has more available backhaul connectivity. In some examples, if core network functionalities are not moved to base station 105-a and/or other base stations 105-b (e.g., authentication, subscription profile verification/HSS processes, security processes, mobility management support functions, tracking/paging functions, bearer activation/deactivation processes, PCRF processes, etc.), such core network function may get delayed and services associated with device 115-a, for example, may be conditionally permitted as described herein. In some cases, the base station 105-a may conditionally permit communication and/or at least some features of a services to be performed amongst devices 115 within the RAN 204. In accordance with some aspects, a service (and/or features thereof) that is conditionally permitted may be permitted by the base station 105-a with a lower QoS than would the service (and/or features thereof) if authentication of that service were authenticated or verified. In some examples, the services (and/or features thereof) of the UEs 115 that may be conditionally permitted by the base station 105-a may be limited to low bandwidth specific applications within the RAN 204 (e.g., text messaging), but the UEs may not be allowed to communicate external to the RAN 204 (e.g., via backhaul connection 252-a).

It is to be appreciated that certain wireless network environments may warrant extensive communication within the RAN portion of the corresponding wireless network, and less communication external to the RAN portion. For example, wireless network environments associated with airplanes, trains, and ships (including commercial ships and cruise ships) may exhibit inherently isolated wireless network characteristics such that communication within the RAN portion predominates such network environments. While backhaul connectivity may exist and be necessary in some wireless operations, wireless data traffic between devices, base stations, and other internal elements and resources within the RAN portion may be significantly higher and less expensive.

Figure 3:
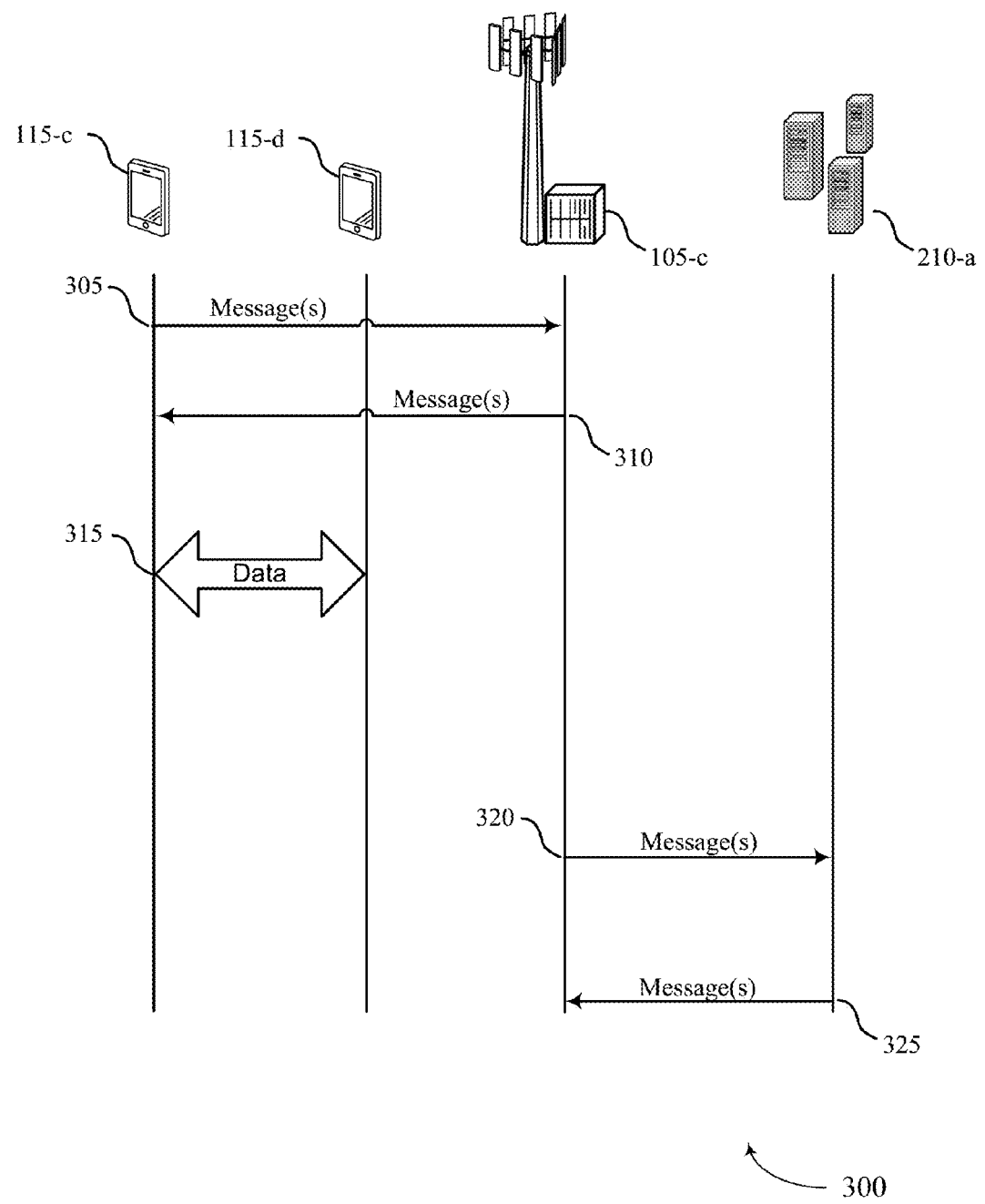
FIG. 3 illustrates an example of a flow diagram that supports mitigating constrained backhaul availability between a RAN and core network in accordance with various aspects of the present disclosure.

FIG. 3 illustrates an example of a flow diagram 300 for mitigating constrained backhaul availability between a RAN and core network in accordance with various aspects of the present disclosure. Flow diagram 300 may include devices 115-c and 115-d, base station 105-c, and core network 210-a, which may be examples of a UE 115, base station 105, and core network 210 described with reference to FIGS. 1, 2A, and 2B.

Base station 105-c may receive one or more messages 305 including control plane signaling associated with a service to be performed by device 115-c. For example, the service may relate to text messaging, and device 15-c may wish to send a text message to device 115-d. Base station 105-c may not know whether device 115-c is authorized to perform such text messaging service. Due to a backhaul bottleneck condition, base station 105-c may have limited communication with one or more servers of the core network 210-a via a backhaul connection 252. Thus, base station 105-c may not attempt to ascertain whether device 115-c is authorized (e.g., where the base station 105-c does not have knowledge of device 115-c with respect to the service). However, base station 105-c may transmit one or more messages 310 conditionally permitting one or more features of the text messaging. For example, base station 105-c may conditionally permit features such as text messages to and from devices 115 within the RAN 204 (e.g., other users or content hosting devices within the RAN 204).

The conditional permission provided by the base station 105-c may be limited in scope (e.g., by devices or subset of devices), by time of day, and/or by amount of data (e.g., a character limitation), for example. Thus, device 115-c may be permitted (at least conditionally) to transmit data 315 to and from device 115-d. In this regard, the base station 105-c may assign a permission level (e.g., data plane connectivity within the figurative island network scenario) associated with the service and the device 115-c. It is to be appreciated that data from different devices 115 may be treated differently until the permission levels are ascertained by the base station 105-c in communication with the core network 210a via the backhaul connection 252. In some implementations, certain service may have defined classes of use for which at least some features of the service do not require any authentication by the base station 105-c.

Additionally, the base station 105-c may assign a QoS metric for data transmission external to the RAN 204 associated with one or more feature of the service. In some aspects, QoS classes may be assigned by the base station 105-c that are revised or new with respect to corresponding QoS classes for similar service that are not associated with a wireless communications system having a backhaul connection 252 that is constrained due to a backhaul bottleneck condition. These revised or new QoS classes may be assigned by the base station 105-c when conditional permission of one or more features of a service for which conditional permission has been granted based at least in part on the backhaul bottleneck condition. In some cases, base station 105-c may notify device 115-c that data (or portions thereof) scheduled for transmission over the backhaul connection 252 may not be guaranteed. Base station 105-a may delay data transmission external to the RAN 204 based at least in part on a predefined amount of data buffered by the baser station 105-a or a predefined time period for transmission. For example, base station 105-c may schedule a data transmission to a local server (e.g., within the RAN 204 by a first predefined time), and send the data transmission to a distant server (e.g., external to the RAN 204 via the backhaul connection 252 by a second predefined time). In some cases, base station 105-c may notify device 115-c if and when data (or portions thereof) scheduled for transmission was successfully transmitted over the backhaul connection 252.

The base station 105-c may prohibit or delay certain features of the text messaging service such as data transmission to or that require communication with one or more servers of the core network 210-a via the backhaul connection 252. For example, base station 105-c may permit data transmission through the backhaul connection 252, but may stipulate a low QoS for such data transmissions. In some cases, base station 105-a may establish a delay tolerant bearer channel using the backhaul connection 252 for data transmission external to the RAN 204. For example, when bearer channels are setup by the base station 105-a, the bearer channels may be classified as "delay tolerant" with appropriate thresholds for wait time and priorities.

In some cases, the base station 105-c may receive a conditional request from device 115-c to transmit or receive data via the backhaul connection 252 (e.g., to or from the Operator's IP Services 222). Such a conditional request from device 115-c may be subject to a successful authentication of the service (or features thereof) by the base station 105-c via the backhaul connection 252.

After a time period that may be based on the degree or type of backhaul bottleneck condition, for example, base station 105-c may transmit one or more messages 320 to the core network 210-a for authenticating the service (e.g., text messaging service) with respect to device 115-c. The base station 105-c may receive one or more messages 325 from the core network 210-a in response to the authentication request. For example, the core network 210-a may indicate that the device 115-c may be authorized to perform the service. Thus, the base station 105-c may make the conditional permission a permanent permission (at least for a particular duration after which the base station 105-c may require a subsequent authentication request).

In accordance with some examples, the base station 105-c may assign a first permission level associated with a service and the device 115-c. This first permission level may be used during a conditionally permission period for the device 115-c associated with one or more features of the service. The base station 105-c may subsequently communicate via the backhaul connection 252 with a server of or related to the core network 410-a. The subsequent communication may be initiated by the base station 105-c to verify the one or more feature of the service with respect to the device 115-c after conditionally permitting the one or more features of the service. Upon completion of the verification process, the base station 105-c may assign a second permission level associated with the service and the device 115-c based at least in part on a result of verifying the one or more features with respect to the device 115-c.

Figure 4:
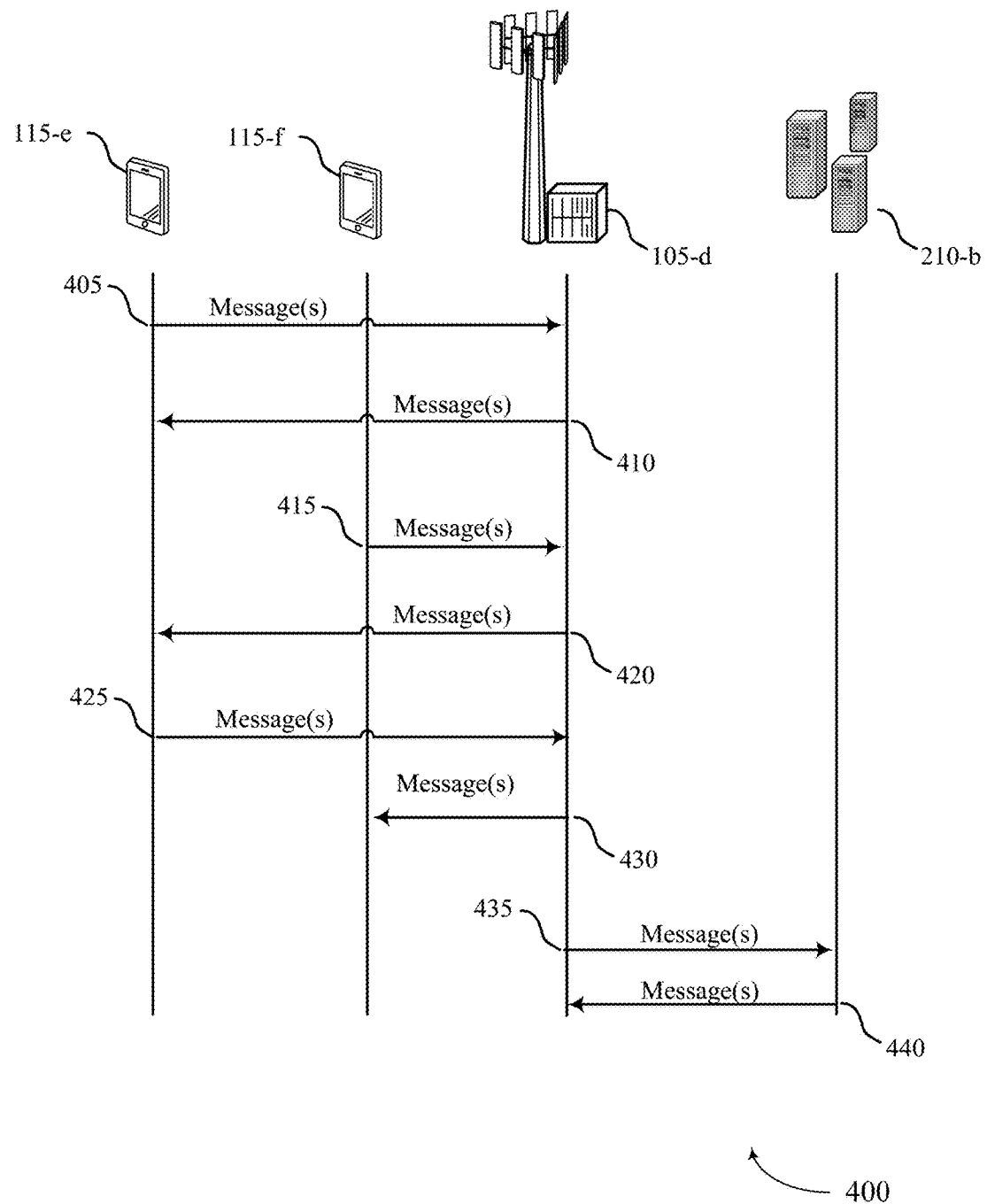
FIG. 4 illustrates an example of a flow diagram that supports mitigating constrained backhaul availability between a RAN and core network in accordance with various aspects of the present disclosure.

FIG. 4 illustrates an example of a flow diagram 400 for mitigating constrained backhaul availability between a RAN and core network in accordance with various aspects of the present disclosure. Flow diagram 400 may include devices 115-e and 115-f, base station 105-d, and core network 210-b, which may be examples of a UE 115, base station 105, and core network 210 described with reference to FIGS. 1, 2A, and 2B.

Base station 105-d may receive one or more messages 405 including control plane signaling associated with a service to be performed by device 115-e. For example, the service may relate to a local content hosting service. The local content hosting service may include data transmissions within the RAN 204 and data transmissions external to the RAN 204 via the backhaul connection 252. In some cases, base station 105-d may have knowledge that device 115-e is authorized to perform such local content hosting service (e.g., from a previous request and determination by the device 115-e).

Due to a backhaul bottleneck condition, base station 105-*d* may have limited communication with one or more servers of the core network 210-*b* via a backhaul connection 252. Thus, base station 105-*d* may not attempt to verify or recertify that device 115-*e* is still authorized to perform the service. Thus, base station 105-*d* may transmit one or more messages 410 to device 115-*e* conditionally permitting one or more features of the local content hosting service.

Base station 105-*d* may also receive one or more messages 415 including control plane signaling associated with the service (e.g., the local content hosting service) to be performed by device 115-*f*. In some scenarios, base station 105-*d* may have identified device 115-*e* as having a permission level such that device 115-*e* may serve as an authenticating device. Accordingly, base station 105-*d* may transmit one or more messages 420 to device 115-*e* including a request that device 115-*e* conditionally permit at least some features of the service (e.g., data transmissions within the RAN 204 associated with the local content hosting service) to be performed by device 115-*f*. Device 115-*e* may make a determination that device 115-*f* may be conditionally permitted to perform at least some features of the service, and may transmit one or more messages 425 to base station 105-*d* to notify the base station 105-*d* of the determination. Thus, base station 105-*d* may transmit one or more messages 430 to device 115-*f* indicating that device 115-*f* is conditionally permitted to perform one or more features of the local content hosting service (as determined by device 115-*e*).

After a time period that may be based on the degree or type of backhaul bottleneck condition, for example, base station 105-*d* may transmit one or more messages 435 to the core network 210-*b* for authenticating the service (e.g., local content hosting service) with respect to devices 115-*e* and 115-*f*. The base station 105-*c* may receive one or more messages 440 from the core network 210-*b* in response to the authentication requests. For example, the core network 210-*b* may indicate that the device 115-*e* remains authorized to perform the service; however, that the device 115-*f* may no longer be authorized to perform the service.

As illustrated in the example of FIG. 4, local caching and/or local content hosting may be leveraged within the RAN 204 to mitigate constrained backhaul availability between RAN 204 and the core network 210-*b*. In this regard, private networks associated with industrial, agricultural, or manufacturing settings, in which data created and consumed locally may exceed that data capabilities and/or requirements outside the particular setting, can be addressed by aspects of the present disclosure. For example, in an agriculture setting, multiple sensors may be deployed. The data from these sensors may be of primary benefit to local farmers. In some cases, access to the wireless communications system supporting the agriculture setting may be conditionally permitted by a certain characteristic of the corresponding sensor (e.g., type, class, maker, etc.). Data may be collected and locally analyzed on local servers (e.g., within the RAN 204 and/or without utilizing the backhaul connection 252. In some cases, external consultants can access and utilize the data through the backhaul connection 252 via a request, for example. It is to be appreciated that bandwidth and throughput within the agriculture setting may be readily available in the RAN 204 portion, thereby allowing for similar local sensor applications such as, but not limited to, video telemetry and agriculture drone or robot deployment despite the wireless communication system being in limited communication with the core network 210-*b* via the backhaul connection 252 that is constrained.

Figure 5:
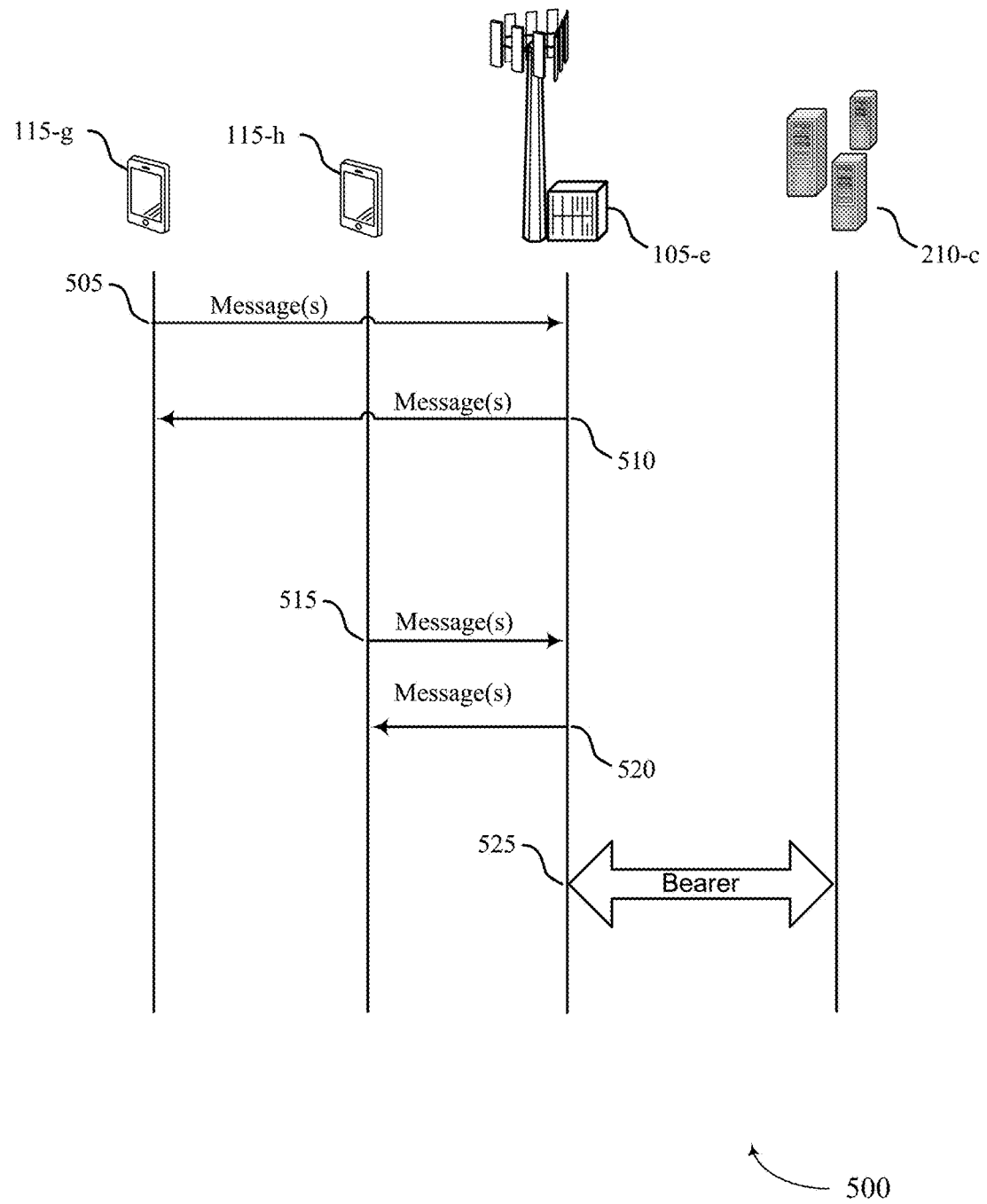
FIG. 5 illustrates an example of a flow diagram that supports mitigating constrained backhaul availability between a RAN and core network in accordance with various aspects of the present disclosure.

FIG. 5 illustrates an example of a flow diagram 500 for mitigating constrained backhaul availability between a RAN and core network in accordance with various aspects of the present disclosure. Flow diagram 500 may include devices 115-*g* and 115-*h*, base station 105-*e*, and core network 210-*c*, which may be examples of a UE 115, base station 105, and core network 210 described with reference to FIGS. 1, 2A, and 2B.

Base station 105-*e* may receive one or more messages 505 including control plane signaling associated with a service to be performed by device 115-*g*. For example, the service may relate to a web hosting service. The web hosting service may include data transmissions within the RAN 204 (e.g., local web servers or proxies) and data transmissions external to the RAN 204 via the backhaul connection 252 (e.g., remote web servers). Base station 105-*e* may not know whether device 115-*g* is authorized to perform such web hosting service (and various features thereof). Due to a backhaul bottleneck condition, base station 105-*e* may have limited communication with one or more servers of the core network 210-*c* via the backhaul connection 252. Thus, base station 105-*e* may not attempt to ascertain whether device 115-*g* is authorized (e.g., where the base station 105-*e* does not have knowledge of device 115-*g* with respect to the service). However, base station 105-*e* may transmit one or more messages 510 conditionally permitting one or more features of the web hosting service. For example, base station 105-*e* may conditionally permit features such as data transmissions within the RAN 204 (e.g., local web servers or proxies).

Similarly, base station 105-*e* may receive one or more messages 515 including control plane signaling associated with a service to be performed by device 115-*h*. For example, the service may relate to an email service. The email service may include data transmissions within the RAN 204 (e.g., email delivery to and receipt from other devices 115 within the RAN 204) and data transmissions external to the RAN 204 via the backhaul connection 252 (e.g., email delivery to and receipt from devices that are require use of the backhaul connection 252). Base station 105-*e* may not know whether device 115-*h* is authorized to perform such email service (and various features thereof). Due to a backhaul bottleneck condition, base station 105-*e* may have limited communication with one or more servers of the core network 210-*c* via the backhaul connection 252. Thus, base station 105-*e* may not attempt to ascertain whether device 115-*h* is authorized (e.g., where the base station 105-*e* does not have knowledge of device 115-*h* with respect to the service). However, base station 105-*e* may transmit one or more messages 520 conditionally permitting one or more features of the email service. For example, base station 105-*e* may conditionally permit features such as data transmissions within the RAN 204 (e.g., email delivery to and receipt from other devices 115 within the RAN 204).

To address data transmissions external to the RAN 204, base station 105-*e* may establishing an aggregate bearer channel 525 using the backhaul connection 252. The aggregate bearer channel 525 may provide for data transmissions external to the RAN 204 for the web hosting service associated with device 115-*g* and the email service associated with device 115-*h*. In view of the constrained backhaul availability between RAN 204 and core network 210-*c*, the base station 105-*e* may selectively initiate data transmission via the aggregate bearer channel 525. For example, base station 105-*e* may initiate data transmissions based at least in part on detection of data for transmission by both the device 115-*g* and the device 115-*h*. In this manner, utilization of the backhaul connection 252 that is constrained due to a backhaul bottleneck condition may be improved.

Additionally or alternatively, delaying data transmissions external to the RAN 204 may include caching data associated with an external data transmission request at base station 105-*e*, and transmitting the cached data associated with the external transmission request from the base station 105-*e* to one or more servers of the core network 210-*c* via the backhaul connection 252 when the condition has been met (e.g., triggered by data transmissions queued for two or more services, triggered by data transmissions queued for two or more devices 115 using the same service, triggered by amount to data buffered at the base station 105-*e* regardless of devices or services, triggered by a number of authentication requests pending at the base station 105-*e* exceeding a certain threshold).

Figure 6:
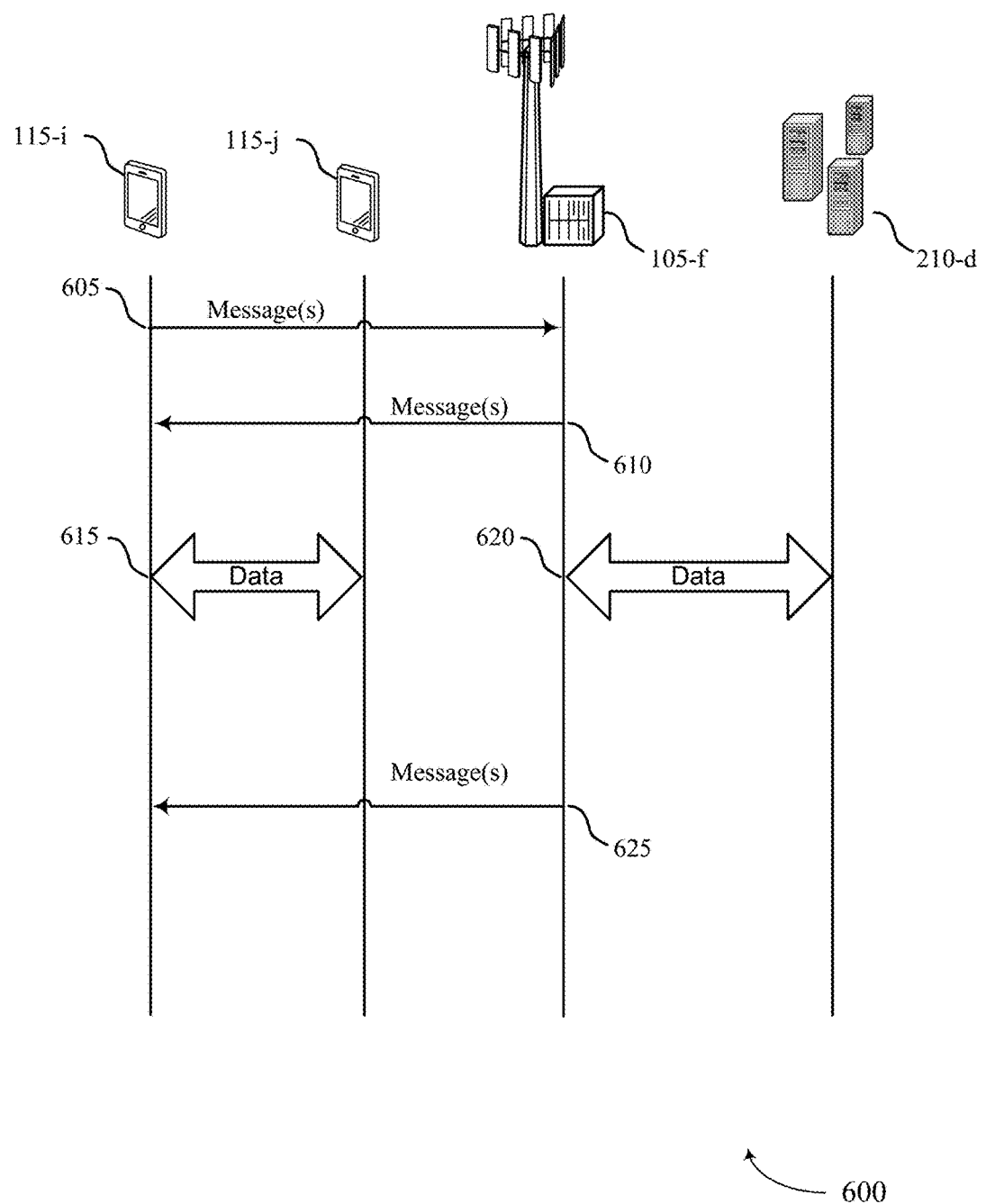
FIG. 6 illustrates an example of a flow diagram that supports mitigating constrained backhaul availability between a RAN and core network in accordance with various aspects of the present disclosure.

FIG. 6 illustrates an example of a flow diagram 600 for mitigating constrained backhaul availability between a RAN and core network in accordance with various aspects of the present disclosure. Flow diagram 600 may include devices 115-*i* and 115-*j*, base station 105-*f*, and core network 210-*d*, which may be examples of a UE 115, base station 105, and core network 210 described with reference to FIGS. 1, 2A, and 2B.

Base station 105-*f* may receive one or more messages 605 including control plane signaling associated with a service to be performed by device 115-*i*. For example, the service may relate to voice services, and device 115-*i* may wish to call device 115-*j*. Base station 105-*f* may not know whether device 115-*i* is authorized to perform such voice service. Due to a backhaul bottleneck condition, base station 105-*f* may have limited communication with one or more servers of the core network 210-*d* via a backhaul connection 252. Thus, base station 105-*f* may not attempt to ascertain whether device 115-*i* is authorized (e.g., where the base station 105-*f* does not have knowledge of device 115-*i* with respect to the service). However, base station 105-*f* may transmit one or more messages 610 conditionally permitting one or more features of the voice calling service. For example, base station 105-*f* may conditionally permit features such as voice calling to and from devices 115 within the RAN 204.

To address data transmissions associated with the voice calling feature of the voice service, base station 105-*f* may establishing a data channel 615 for voice calling between device 115-*i* and device 115-*j* (e.g., internal to the RAN 204). Base station 105-*f* may establishing a data channel 620 using the backhaul connection 252 for voice calling external to the RAN 204 (e.g., a long distance call as requested by device 115-*i*). In some aspects, base station 105-*f* may assign a first QoS metric for data transmission associated with data channel 620 external to the RAN 204. Base station 105-*f* may assign a second QoS metric for data transmission associated with data channel 615 internal to the RAN 204. The second QoS metric may be different from the first QoS metric (e.g., the second QoS metric providing a greater guarantee of service).

In some cases, the first QoS metric may be defined by a best-effort delivery attempt to transmit a data packet associated with the voice calling feature. For example, when a voice call is canceled due to a backhaul bottleneck condition, base station 105-*f* may transmit a transmission canceled message to the device 115-*i* associated with the first QoS metric based at least in part on non-transmission of the data packet after a particular time period.

Figure 7:
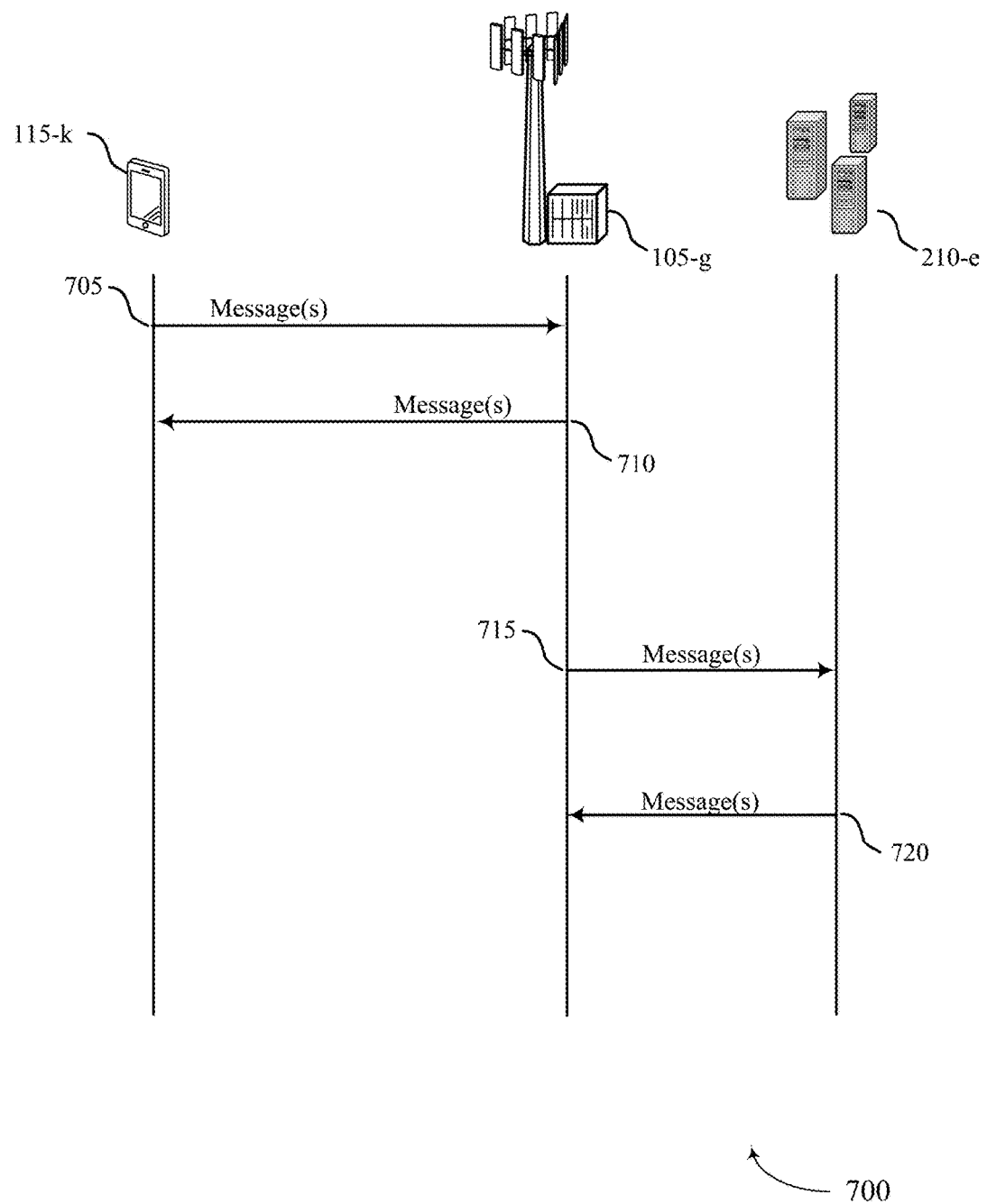
FIG. 7 illustrates an example of a flow diagram that supports mitigating constrained backhaul availability between a RAN and core network in accordance with various aspects of the present disclosure.

FIG. 7 illustrates an example of a flow diagram 700 for mitigating constrained backhaul availability between a RAN and core network in accordance with various aspects of the present disclosure. Flow diagram 700 may include device 115-*k*, base station 105-*g*, and core network 210-*e*, which may be examples of a UE 115, base station 105, and core network 210 described with reference to FIGS. 1, 2A, and 2B.

Base station 105-*g* may receive one or more messages 705 including control plane signaling associated with a service to be performed by device 115-*k*. For example, the service may relate to a voice service. Due to a backhaul bottleneck condition, base station 105-*g* may have limited communication with one or more servers of the core network 210-*e* via a backhaul connection 252. Thus, base station 105-*g* may be configured to perform at least some core network control plane functions associated with the service. For example, base station 105-*g* may be configured to perform a non-access stratum (NAS) function associated with the service and the device 115-*k*. In other examples, base station 105-*g* may be configured to mobility management support function associated with the service and the device 115-*k*. In yet other examples, base station 105-*g* may be configured to perform tracking/paging functions, bearer activation/deactivation processes, PCRF processes, UE IP address allocation, and/or UL and DL rate enforcement. Thus, base station 105-*g* may transmit one or more messages 710 associated with the at least some core network control plane functions to device 115-*k*.

Additionally or alternatively, one or more devices 115 may be configured to perform at least some least some core network control plane functions associated with the service. For example, when base station 105-*g* receives the one or more messages 705 including control plane signaling associated with a service to be performed by the device 115-*k*, the base station 105-*g* may communicate with one or more devices 115 with the RAN 204 that are designated and configured to perform at least some core network control plane functions associated with the service. For example, one or more devices 115 may be configured to perform a non-access stratum (NAS) function associated with the service and the device 115-*k*. In other examples, one or more devices 115 may be configured to perform mobility management support function associated with the service and the device 115-*k*. In yet other examples, one or more devices 115 may be configured to perform tracking/paging functions, bearer activation/deactivation processes, PCRF processes, UE IP address allocation, and/or UL and DL rate enforcement. Thus, base station 105-*g* and/or one or more devices 115 may transmit the one or more messages 710 associated with the at least some core network control plane functions to device 115-*k*.

In some examples, some core functions may remain on the core network 210-*e*. For example, an authentication process may be performed by the core network 210-*e*, whereas PCRF processes and other core functions may be performed by the base station 105-*g* and/or one or more devices 115. In some examples, base station 105-*g* may transmit one or more messages 715 to the core network 210-*e* associated with the authentication process with respect to device 115-*k*. The base station 105-*g* may receive one or more messages 720 from the core network 210-*e* in response to the authentication request. For example, the core network 210-*e* may indicate that the device 115-*c* may be authorized to perform the service.

Figure 8:
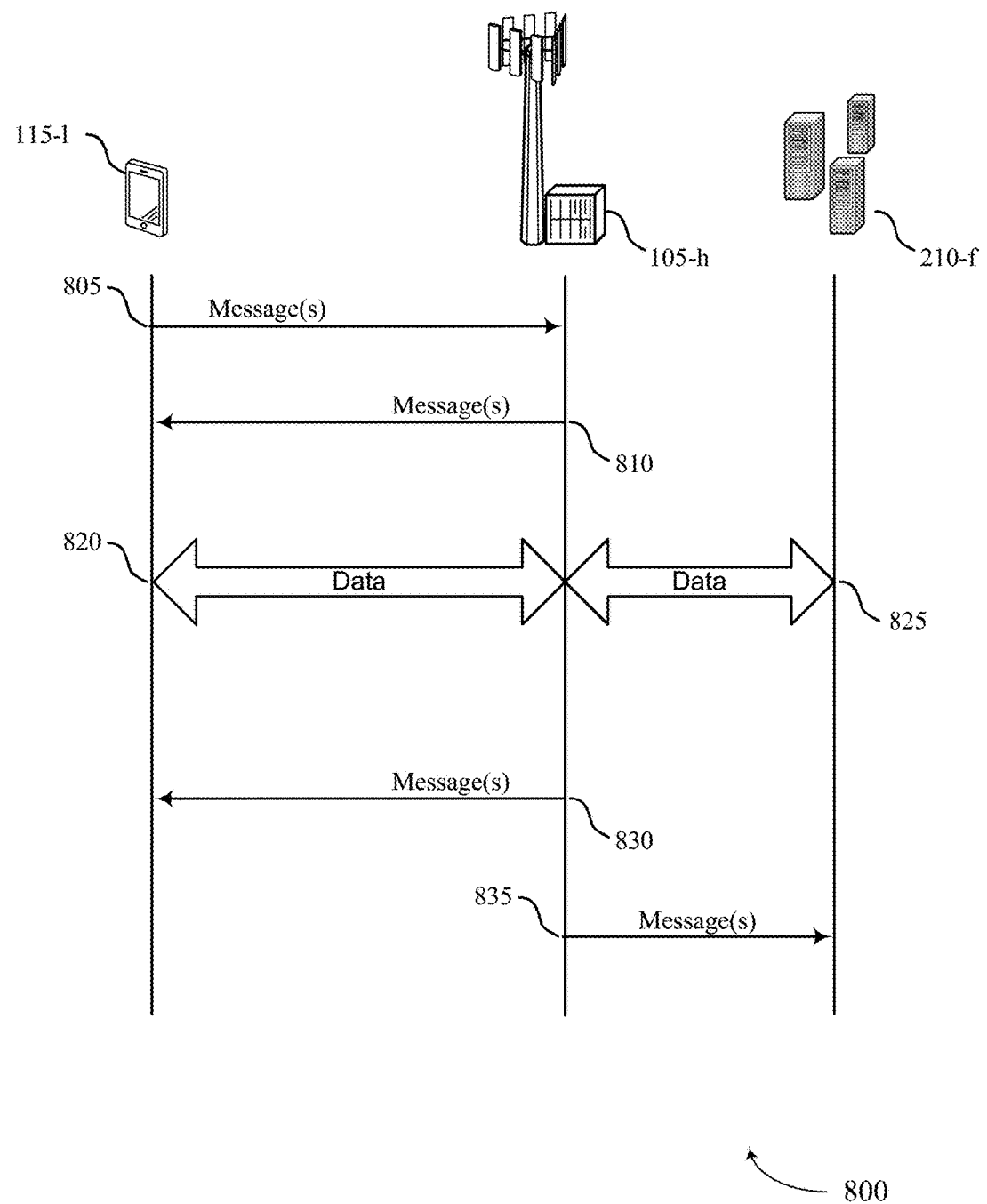
FIG. 8 illustrates an example of a process flow that supports mitigating constrained backhaul availability between a RAN and core network in accordance with various aspects of the present disclosure.

FIG. 8 illustrates an example of a process flow 800 for mitigating constrained backhaul availability between a RAN and core network in accordance with various aspects of the present disclosure. Process flow 800 may include a device 115-1, base station 105-*h*, and core network 210-*f*, which may be examples of a UE 115, base station 105, and core network 210 described with reference to FIGS. 1, 2A, and 2B.

Base station 105-*h* may receive one or more messages 805 including control plane signaling associated with a service to be performed by device 115-1. For example, the service may relate to a web hosting service. Due to a backhaul bottleneck condition, base station 105-*h* may have limited communication with one or more servers of the core network 210-*f* via a backhaul connection 252. Thus, base station 105-*h* may be configured to perform at least some core network control plane functions associated with the service. For example, base station 105-*h* may be configured to perform a proxy function associated with a request by the device 115-1.

In some implementations, base station 105-*h* may initiate the request associated with the web hosting service on behalf of the device 115-1. For example, base station 105-*h* may establishing a data channel 820 for data transmissions between device 115-1 and base station 105-*h* (e.g., internal to the RAN 204) and a data channel 825 using the backhaul connection 252 for data transmissions between the base station 105-*h* and the one or more servers of the core network 210-*f* (e.g., external to the RAN 204). In some aspects, base station 105-*h* may queue data transmissions external to the RAN 205 and transmit the queued data transmissions via the data channel 825 using the backhaul connection 252 at approximately the same time. Base station may then transmit one or more messages 830 for terminating a protocol connection between the device 115-1 and the base station 105-*h*. Base station may also transmit one or more messages 835 for terminating a protocol connection between the base station 105-*h* and the device 115-1. In this regard, performing a proxy function associated proximate to the edge (e.g., at or proximate the base station 105-*h*) may result in a reduced set of data and reducing intervals being transmitted over the backhaul connection 252. For example, base station 105-*h* can transmit the queued data transmissions when certain conditions favorable to utilizing the backhaul connection 252 apply or are satisfied.

Figure 9:
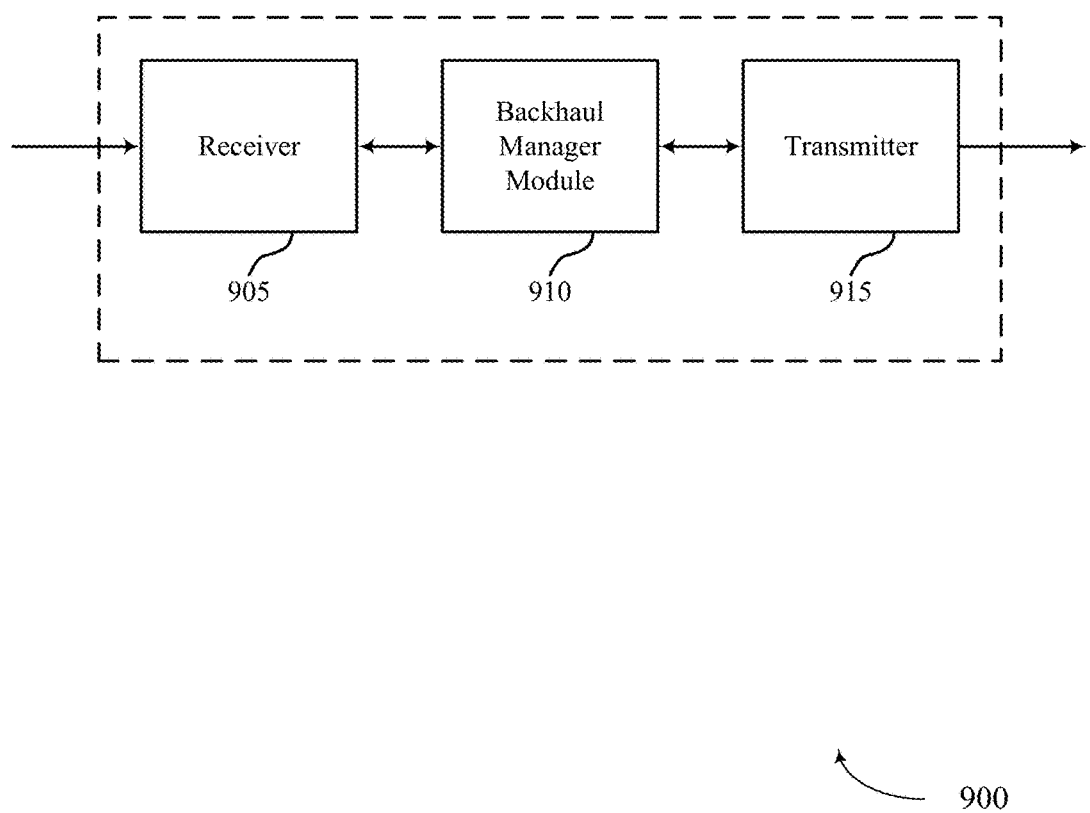
FIGS. 9-11 show block diagrams of a wireless device that supports mitigating constrained backhaul availability between a RAN and core network in accordance with various aspects of the present disclosure.

FIG. 9 shows a block diagram of a wireless device 900 configured for mitigating constrained backhaul availability between a RAN and core network in accordance with various aspects of the present disclosure. Wireless device 900 may be an example of aspects of a device 115 described with reference to FIGS. 1-8. Wireless device 900 may include a receiver 905, a backhaul manager module 910, or a transmitter 915. Wireless device 900 may also include a processor. Each of these components may be in communication with each other.

The receiver 905 may receive information such as packets, user data, or control information associated with various information channels (e.g., control channels, data channels, and information related to mitigating constrained backhaul availability between a RAN and core network, etc.). Information may be passed on to the backhaul manager module 910, and to other components of wireless device 900.

The backhaul manager module 910 may receive, by an edge computing device, control plane signaling associated with a first service to be performed by a first communication device, wherein the edge computing device is within a radio access network (RAN) and is in limited communication with a core network via a backhaul connection that is constrained due to a backhaul bottleneck condition, and conditionally permit, by the edge computing device, a first feature of the first service based at least in part on the backhaul bottleneck condition.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
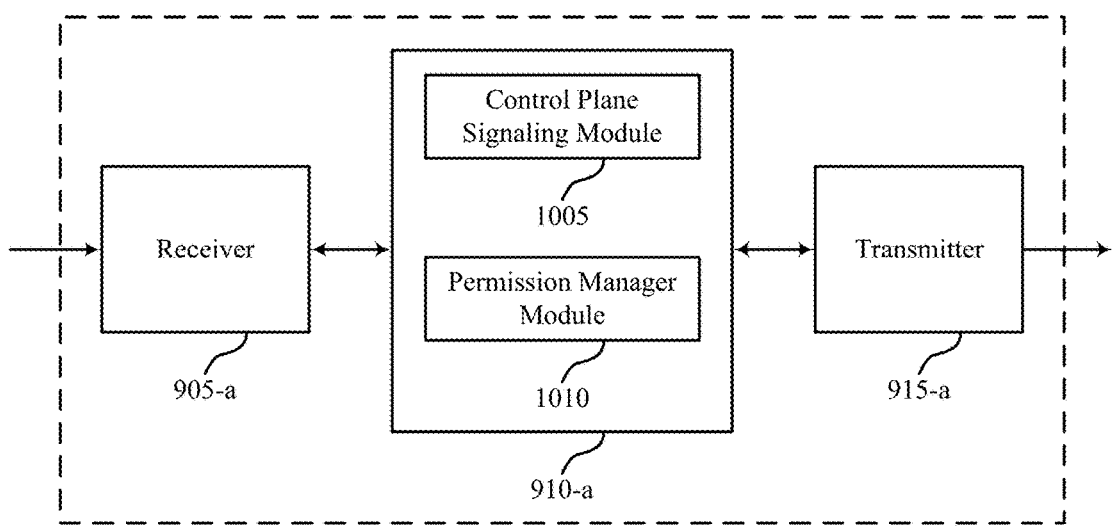

FIG. 10 shows a block diagram of a wireless device 1000 for mitigating constrained backhaul availability between a RAN and core network in accordance with various aspects of the present disclosure. Wireless device 1000 may be an example of aspects of a wireless device 900 or a device 115 described with reference to FIGS. 1-9. Wireless device 1000 may include a receiver 905-*a*, a backhaul manager module 910-*a*, or a transmitter 915-*a*. Wireless device 1000 may also include a processor. Each of these components may be in communication with each other. The backhaul manager module 910-*a* may also include a control plane signaling module 1005, and a permission manager module 1010.

The receiver 905-*a* may receive information which may be passed on to backhaul manager module 910-*a*, and to other components of wireless device 1000. The backhaul manager module 910-*a* may perform the operations described with reference to FIG. 9. The transmitter 915-*a* may transmit signals received from other components of wireless device 1000.

The control plane signaling module 1005 may receive, by an edge computing device, control plane signaling associated with a first service to be performed by a first communication device, wherein the edge computing device is within a radio access network (RAN) and is in limited communication with a core network via a backhaul connection that is constrained due to a backhaul bottleneck condition as described with reference to FIGS. 2-8. The control plane signaling module 1005 may also receive, by the edge computing device, control plane signaling associated with the first service to be performed by a second communication device. The control plane signaling module 1005 may also receive, by the edge computing device, control plane signaling associated with a second service to be performed by a second communication device. In some examples, the first service may be a local content hosting service and the first feature may be data transmission associated with a local content host server. The control plane signaling module 1005 may also receive, by an edge computing device, control plane signaling associated with a service to be performed by a first communication device, wherein the edge computing device is within a radio access network portion (RAN) and is in limited communication with a core network via a backhaul connection that is constrained due to a backhaul bottleneck condition. The control plane signaling module 1005 may also transmit at least some of the control plane signaling associated with the service to a core network server via the backhaul connection. The control plane signaling module 1005 may also perform the proxy function associated with the request comprises initiating, by the edge computing device, the request associated with the service on behalf of the first communication device. The control plane signaling module 1005 may also perform the proxy function associated with the request comprises terminating a first protocol connection between the first communication device and the edge computing device. The control plane signaling module 1005 may also terminate a second protocol connection between the edge computing device and a server associated with the service.

The permission manager module 1010 may conditionally permit, by the edge computing device, a first feature of the first service based at least in part on the backhaul bottleneck condition as described with reference to FIGS. 2-8. The permission manager module 1010 may also conditionally permit the first feature of the first service comprises conditionally permitting the first feature of the first service without verifying, via the backhaul connection, the first feature with respect to the first communication device. The permission manager module 1010 may also assign, by the edge computing device, a first permission level associated with the first service and the first communication device. The permission manager module 1010 may also transmit, by the edge computing device, a request to the first communication device to conditionally permit the first feature of the first service to be performed by the second communication device. The permission manager module 1010 may also conditionally permit, by the edge computing device, a second feature of the second service without verifying the second feature with respect to the second communication device via the backhaul connection. The permission manager module 1010 may also assign, by the edge computing device, a first permission level associated with the first service and the first communication device. The permission manager module 1010 may also assign, by the edge computing device, a second permission level associated with the first service and the first communication device based at least in part on a result of verifying the first feature with respect to the first communication device.

Figure 11:
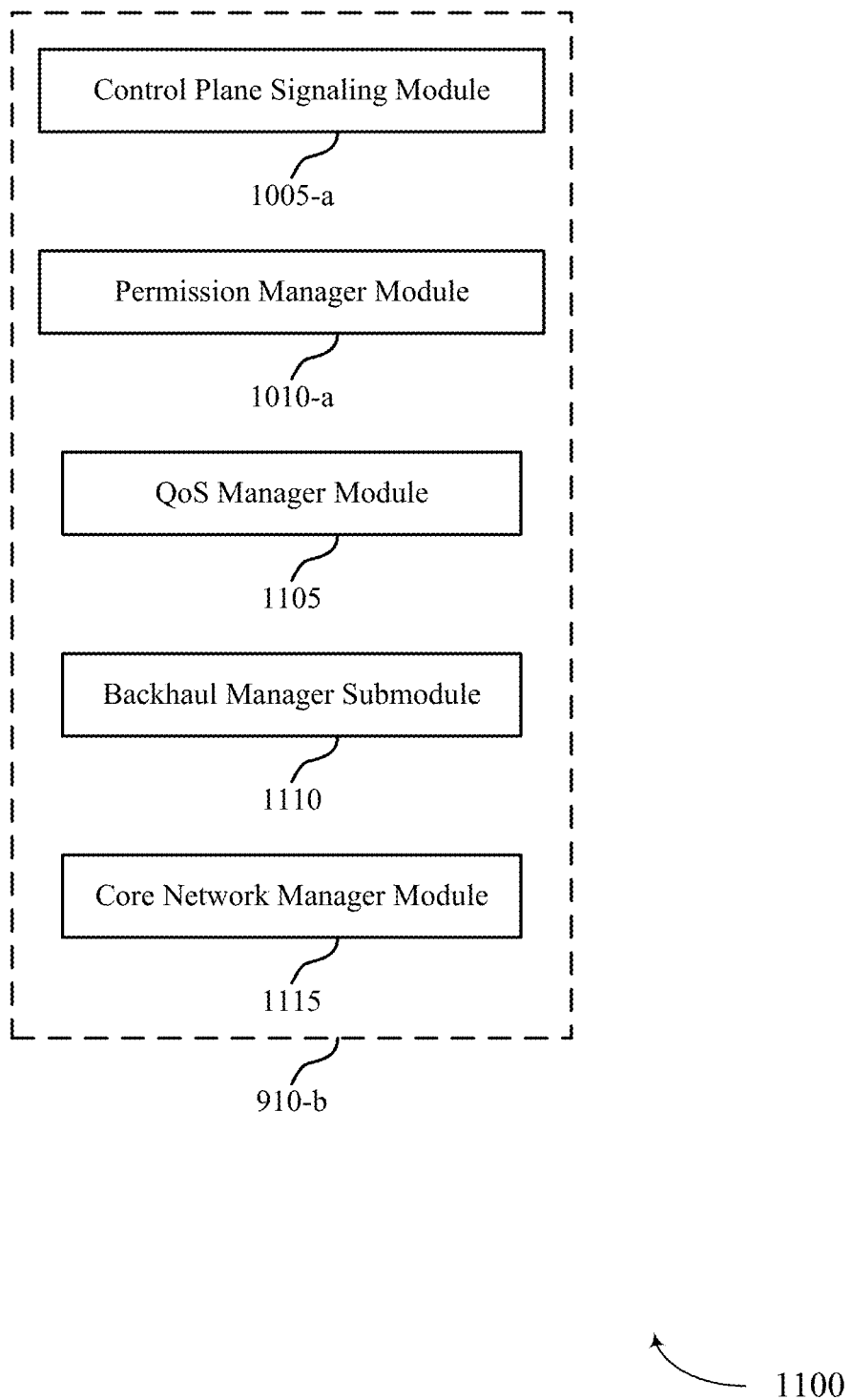

FIG. 11 shows a block diagram 1100 of a backhaul manager module 910-*b* which may be a component of a wireless device 900 or a wireless device 1000 for mitigating constrained backhaul availability between a RAN and core network in accordance with various aspects of the present disclosure. The backhaul manager module 910-*b* may be an example of aspects of a backhaul manager module 910 described with reference to FIGS. 9-10. The backhaul manager module 910-*b* may include a control plane signaling module 1005-*a*, and a permission manager module 1010-*a*. Each of these modules may perform the functions described with reference to FIG. 10. The backhaul manager module 910-*b* may also include a QoS manager module 1105, a backhaul manager submodule 1110, and a core network manager module 1115.

The QoS manager module 1105 may assign, by the edge computing device, a first quality of service (QoS) metric for data transmission external to the RAN associated with the first feature of the first service as described with reference to FIGS. 2-8. The QoS manager module 1105 may also assign, by the edge computing device, a first quality of service (QoS) metric for data transmission external to the RAN associated with the first feature of the service, and assigning, by the edge computing device, a second QoS metric for data transmission internal to the RAN associated with the first feature of the service, the second QoS metric being different from the first QoS metric. In some examples, the first QoS metric may be defined by a best-effort delivery attempt to transmit a data packet. The QoS manager module 1105 may also transmit a transmission canceled message to the first communication device associated with the first QoS metric based at least in part on non-transmission of the data packet after a time period.

The backhaul manager submodule 1110 may delay, by the edge computing device, data transmission external to the RAN based at least in part on a predefined amount of data buffered by the edge computing device or a predefined time period for transmission as described with reference to FIGS. 2-8. The backhaul manager submodule 1110 may also establish a delay tolerant bearer channel using the backhaul connection for data transmission external to the RAN. The backhaul manager submodule 1110 may also establish an aggregate bearer channel using the backhaul connection for data transmission external to the RAN associated with the first service and the second service. The backhaul manager submodule 1110 may also initiate data transmission via the aggregate bearer channel based at least in part on detection of data for transmission by both the first communication device and the second communication device. The backhaul manager submodule 1110 may also communicate, via the backhaul connection, with a server to verify the first feature of the first service with respect to the first communication device after conditionally permitting the first feature. In some examples, the backhaul bottleneck condition may be a condition relating to non-contiguous availability of the backhaul network connection such that connectivity provided to the RAN via the backhaul connection may be purposefully disconnected. In some examples, the backhaul connection comprises a satellite link and the backhaul bottleneck condition comprises temporal availability of the satellite link for communication with the edge computing device.

The core network manager module 1115 may perform, by the edge computing device, at least some core network control plane functions associated with the service, based at least in part on the backhaul bottleneck condition as described with reference to FIGS. 2-8. The core network manager module 1115 may also perform at least some core network control plane functions associated with the service comprises performing, by the edge computing device, a non-access stratum (NAS) function associated with the service. The core network manager module 1115 may also perform at least some core network control plane functions associated with the service comprises performing, by the edge computing device, a mobility management support function associated with the service. The core network manager module 1115 may also perform at least some core network control plane functions associated with the service comprises performing, by the edge computing device, a policy control and charging rules function (PCRF) process associated with the service. The core network manager module 1115 may also perform at least some core network control plane functions associated with the service comprises performing, by the edge computing device, a proxy function associated with a request by the first communications device. In some examples, the service may be a voice over Internet protocol (VoIP) service.

Figure 12:
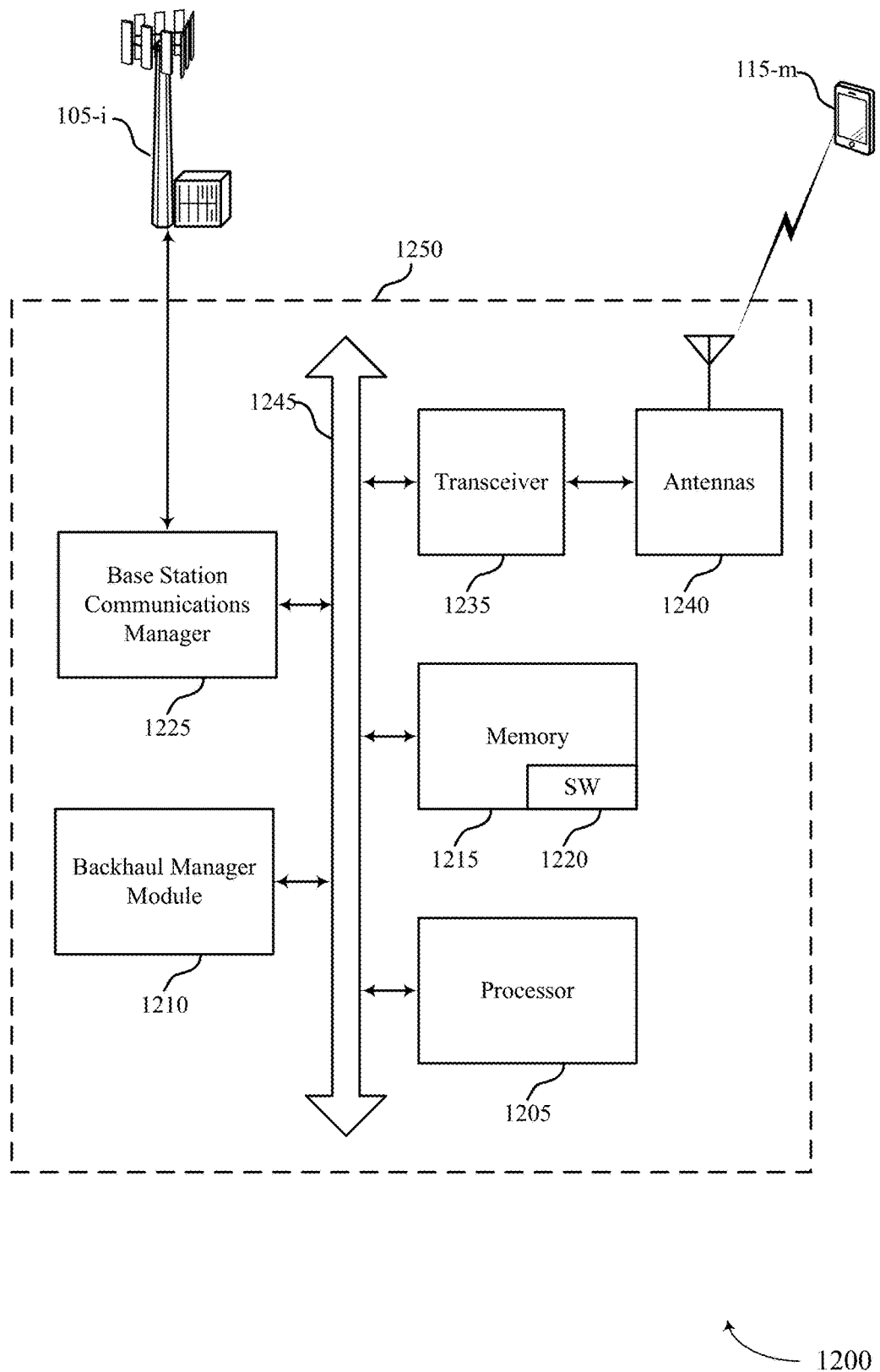
FIG. 12 illustrates a block diagram of a system including a device that supports mitigating constrained backhaul availability between a RAN and core network in accordance with various aspects of the present disclosure.

FIG. 12 shows a diagram of a system 1200 including an edge computing device 1250 configured for mitigating constrained backhaul availability between a RAN and core network in accordance with various aspects of the present disclosure. System 1200 may include edge computing device 1250, which may be an example of a wireless device 900 or a wireless device 1000 described with reference to FIGS. 9-11. Edge computing device 1250 may include a backhaul manager module 1210, which may be an example of a backhaul manager module 910 described with reference to FIGS. 9-11. Edge computing device 1250 may also include a base station communications manager 1225 through which communications with base station 105-I may be managed. Edge computing device 1250 may also include components for bi-directional voice and data communications including components for transmitting communications and components for receiving communications.

Edge computing device 1250 may also include a processor 1205, and memory 1215 (including software (SW)) 1220, a transceiver 1235, and one or more antenna(s) 1240, each of which may communicate, directly or indirectly, with one another (e.g., via buses 1245). The transceiver 1235 may communicate bi-directionally, via the antenna(s) 1240 or wired or wireless links, with one or more networks, as described above. For example, the transceiver 1235 may communicate bi-directionally with one or more UEs 115-*m*. The transceiver 1235 may include a modem to modulate the packets and provide the modulated packets to the antenna(s) 1240 for transmission, and to demodulate packets received from the antenna(s) 1240. While edge computing device 1250 may include a single antenna 1240, edge computing device 1250 may also have multiple antennas 1240 capable of concurrently transmitting or receiving multiple wireless transmissions.

The memory 1215 may include random access memory (RAM) and read only memory (ROM). The memory 1215 may store computer-readable, computer-executable software/firmware code 1220 including instructions that, when executed, cause the processor 1205 to perform various functions described herein (e.g., mitigating constrained backhaul availability between a RAN and core network, etc.). Alternatively, the software/firmware code 1220 may not be directly executable by the processor 1205 but cause a computer (e.g., when compiled and executed) to perform functions described herein. The processor 1205 may include an intelligent hardware device, (e.g., a central processing unit (CPU), a microcontroller, an application specific integrated circuit (ASIC), etc.)

Figure 13:
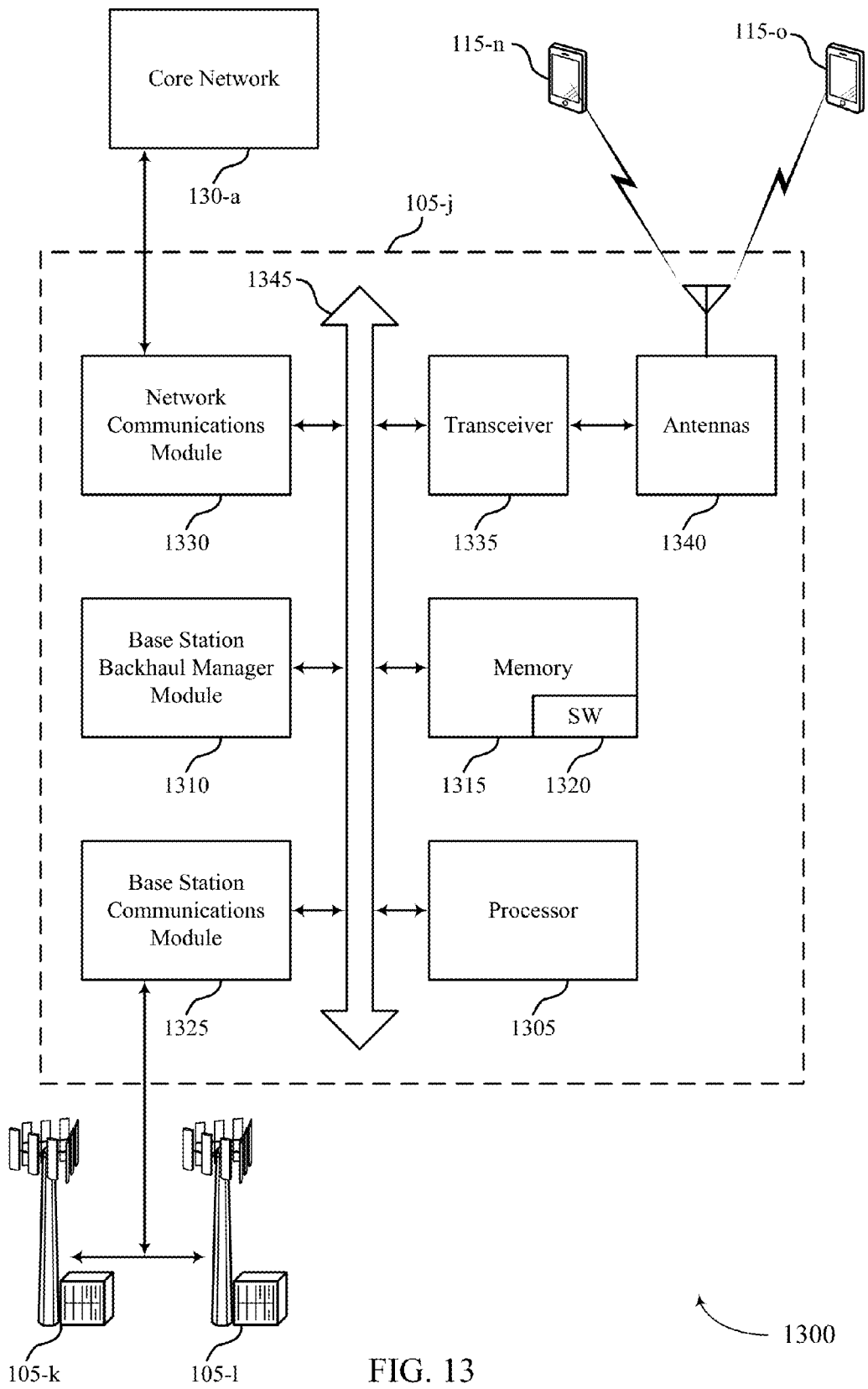
FIG. 13 illustrates a block diagram of a system including a base station that supports mitigating constrained backhaul availability between a RAN and core network in accordance with various aspects of the present disclosure.

FIG. 13 shows a diagram of a system 1300 including a base station 105 configured for mitigating constrained backhaul availability between a RAN and core network in accordance with various aspects of the present disclosure. System 1300 may include base station 105-*j*, which may be an example of a wireless device 1000, a wireless device 1100, or a base station 105 described with reference to FIGS. 1, 2 and 10-12. Base station 105-*j* may include a base station backhaul manager module 1310, which may be an example of a base station backhaul manager module 1310 described with reference to FIGS. 10-12. Base station 105-*j* may also include components for bi-directional voice and data communications including components for transmitting communications and components for receiving communications. For example, base station 105-*j* may communicate bi-directionally with base station 105-*k* or base station 105-*l*.

In some cases, base station 105-*j* may have one or more wired backhaul links. Base station 105-*j* may have a wired backhaul link (e.g., S1 interface, etc.) to the core network 130. Base station 105-*j* may also communicate with other base stations 105, such as base station 105-*k* and base station 105-*l* via inter-base station backhaul links (e.g., an X2 interface). Each of the base stations 105 may communicate with UEs 115 using the same or different wireless communications technologies. In some cases, base station 105-*j* may communicate with other base stations such as 105-*k* or 105-*l* utilizing base station communication module 1325. In some examples, base station communication module 1325 may provide an X2 interface within an LTE/LTE-A wireless communication network technology to provide communication between some of the base stations 105. In some examples, base station 105-*j* may communicate with other base stations through core network 130. In some cases, base station 105-*j* may communicate with the core network 130 through network communications module 1330.

The base station 105-*j* may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115-*n* and 115-*o*, which may be multi-mode devices. The transceiver 1335 (or other components of the base station 105-*j*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*j* may include multiple transceivers 1335, each with one or more associated antennas 1340. The transceiver may be an example of a combined receiver 905 and transmitter 915 of FIG. 9.

The memory 1315 may include RAM and ROM. The memory 1315 may also store computer-readable, computer-executable software code 1320 containing instructions that are configured to, when executed, cause the processor 1310 to perform various functions described herein (e.g., mitigating constrained backhaul availability between a RAN and core network, selecting coverage enhancement techniques, call processing, database management, message routing, etc.). Alternatively, the software 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 900, wireless device 1000, and backhaul manager module 910 (including backhaul manager module 1210 and base station backhaul manager module 1310) may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
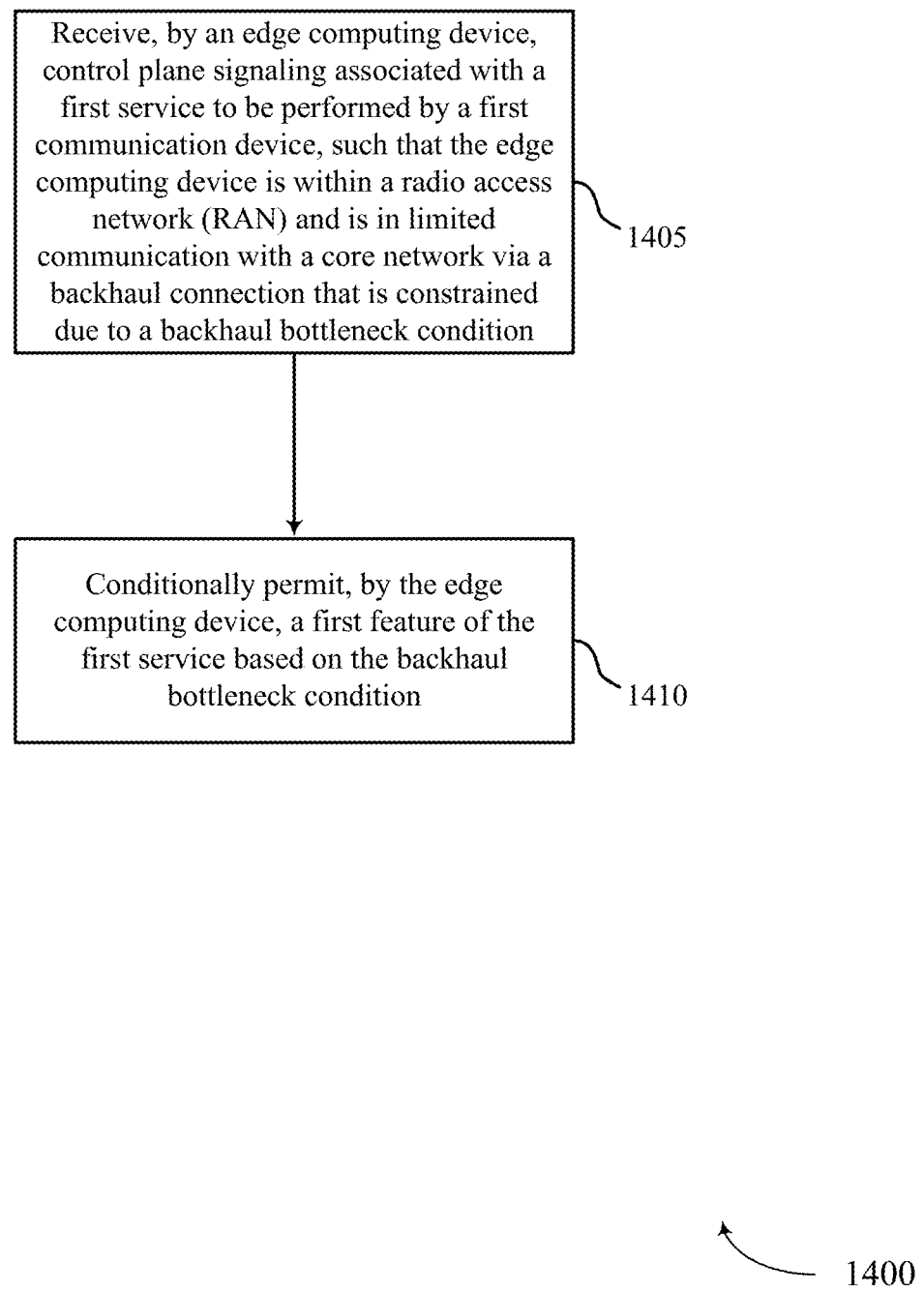
FIGS. 14-21 illustrate methods for mitigating constrained backhaul availability between a RAN and core network in accordance with various aspects of the present disclosure.

FIG. 14 shows a flowchart illustrating a method 1400 for mitigating constrained backhaul availability between a RAN and core network in accordance with various aspects of the present disclosure. The operations of method 1400 may be implemented by a wireless device 900, a wireless device 1000, an edge computing device 1250, or a base station 105, or their components as described with reference to FIGS. 1-13. For example, the operations of method 1400 may be performed by the backhaul manager module 910 or base station backhaul manager module 1310, as described with reference to FIGS. 9-13.

At block 1405, an edge computing device may receive control plane signaling associated with a first service to be performed by a first communication device, wherein the edge computing device is within a radio access network (RAN) and is in limited communication with a core network via a backhaul connection that is constrained due to a backhaul bottleneck condition as described with reference to FIGS. 2-8. In certain examples, the operations of block 1405 may be performed by the control plane signaling module 1005 as described with reference to FIG. 10.

At block 1410, the edge computing device may conditionally permit a first feature of the first service based at least in part on the backhaul bottleneck condition as described with reference to FIGS. 2-8. In certain examples, the operations of block 1410 may be performed by the permission manager module 1010 as described with reference to FIG. 10.

Figure 15:
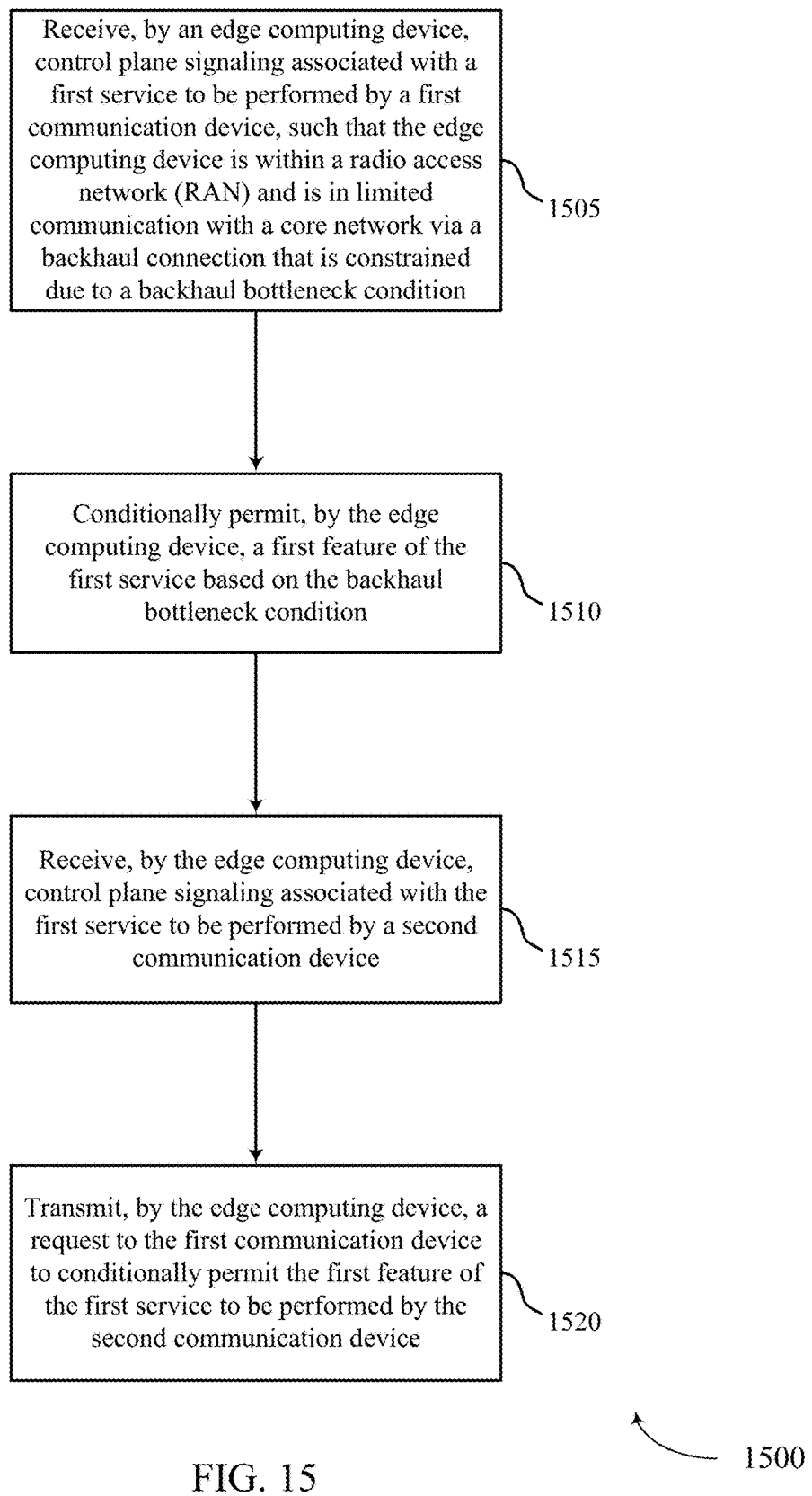

FIG. 15 shows a flowchart illustrating a method 1500 for mitigating constrained backhaul availability between a RAN and core network in accordance with various aspects of the present disclosure. The operations of method 1500 may be implemented by a wireless device 900, a wireless device 1000, an edge computing device 1250, or a base station 105, or their components as described with reference to FIGS. 1-13. For example, the operations of method 1500 may be performed by the backhaul manager module 910 or base station backhaul manager module 1310, as described with reference to FIGS. 9-13. The method 1500 may also incorporate aspects of method 1400 of FIG. 14.

At block 1505, the edge computing device may receive control plane signaling associated with a first service to be performed by a first communication device, wherein the edge computing device is within a radio access network (RAN) and is in limited communication with a core network via a backhaul connection that is constrained due to a backhaul bottleneck condition as described with reference to FIGS. 2-8. In certain examples, the operations of block 1505 may be performed by the control plane signaling module 1005 as described with reference to FIG. 10.

At block 1510, the edge computing device may conditionally permit a first feature of the first service based at least in part on the backhaul bottleneck condition as described with reference to FIGS. 2-8. In certain examples, the operations of block 1510 may be performed by the permission manager module 1010 as described with reference to FIG. 10.

At block 1515, the edge computing device may receive control plane signaling associated with the first service to be performed by a second communication device as described with reference to FIGS. 2-8. In certain examples, the operations of block 1515 may be performed by the control plane signaling module 1005 as described with reference to FIG. 10.

At block 1520, the edge computing device may transmit a request to the first communication device to conditionally permit the first feature of the first service to be performed by the second communication device as described with reference to FIGS. 2-8. In certain examples, the operations of block 1520 may be performed by the permission manager module 1010 as described with reference to FIG. 10.

Figure 16:
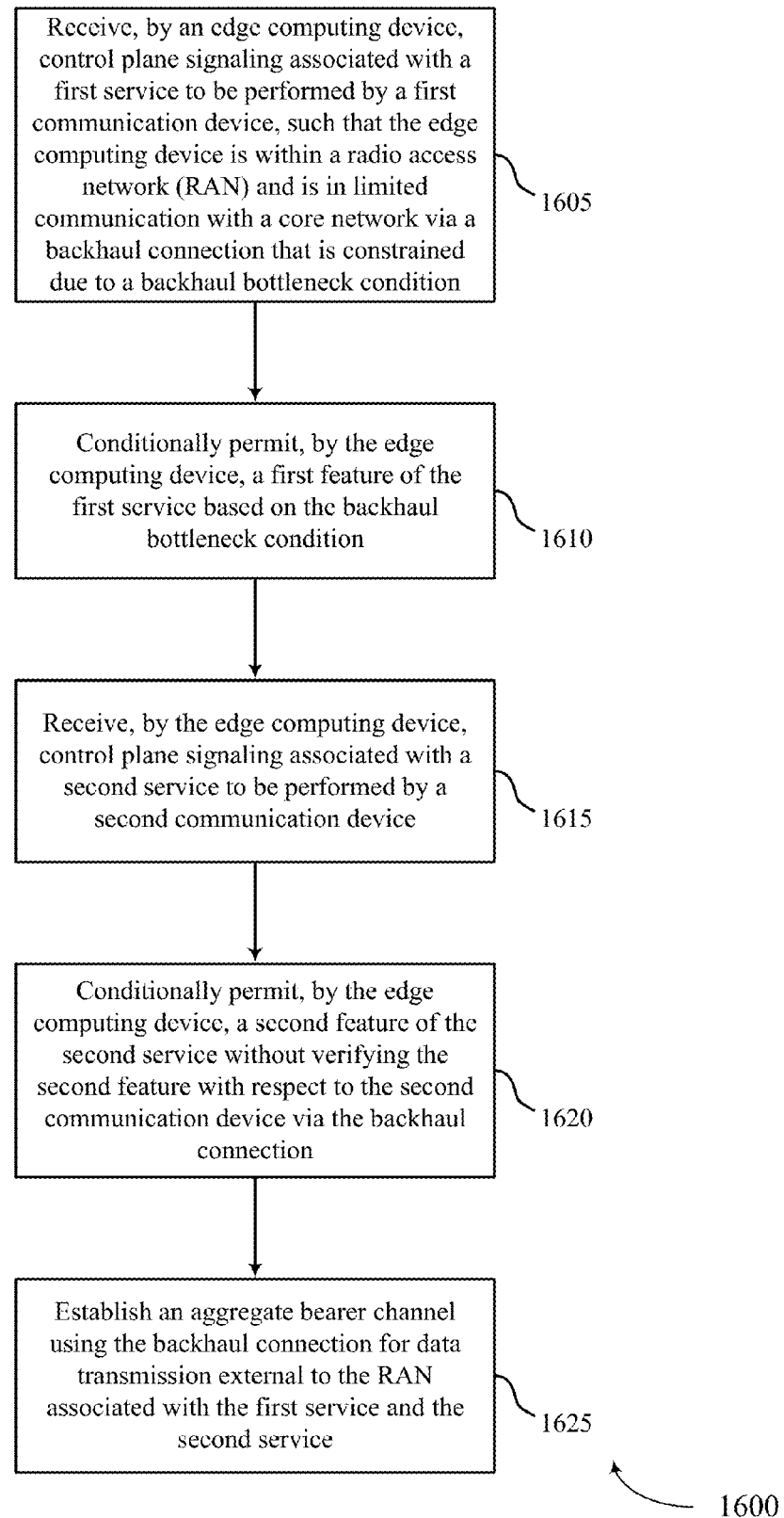

FIG. 16 shows a flowchart illustrating a method 1600 for mitigating constrained backhaul availability between a RAN and core network in accordance with various aspects of the present disclosure. The operations of method 1600 may be implemented by a wireless device 900, a wireless device 1000, an edge computing device 1250, or a base station 105, or their components as described with reference to FIGS. 1-13. For example, the operations of method 1600 may be performed by the backhaul manager module 910 or base station backhaul manager module 1310, as described with reference to FIGS. 9-13. The method 1600 may also incorporate aspects of methods 1400, and 1500 of FIGS. 14-15.

At block 1605, the edge computing device may receive control plane signaling associated with a first service to be performed by a first communication device, wherein the edge computing device is within a radio access network (RAN) and is in limited communication with a core network via a backhaul connection that is constrained due to a backhaul bottleneck condition as described with reference to FIGS. 2-8. In certain examples, the operations of block 1605 may be performed by the control plane signaling module 1005 as described with reference to FIG. 10.

At block 1610, the edge computing device may conditionally permit a first feature of the first service based at least in part on the backhaul bottleneck condition as described with reference to FIGS. 2-8. In certain examples, the operations of block 1610 may be performed by the permission manager module 1010 as described with reference to FIG. 10.

At block 1615, the edge computing device may receive control plane signaling associated with a second service to be performed by a second communication device as described with reference to FIGS. 2-8. In certain examples, the operations of block 1615 may be performed by the control plane signaling module 1005 as described with reference to FIG. 10.

At block 1620, the edge computing device may conditionally permit a second feature of the second service without verifying the second feature with respect to the second communication device via the backhaul connection as described with reference to FIGS. 2-8. In certain examples, the operations of block 1620 may be performed by the permission manager module 1010 as described with reference to FIG. 10.

At block 1625, the edge computing device may establish an aggregate bearer channel using the backhaul connection for data transmission external to the RAN associated with the first service and the second service as described with reference to FIGS. 2-8. In certain examples, the operations of block 1625 may be performed by the backhaul manager submodule 1110 as described with reference to FIG. 11.

Figure 17:
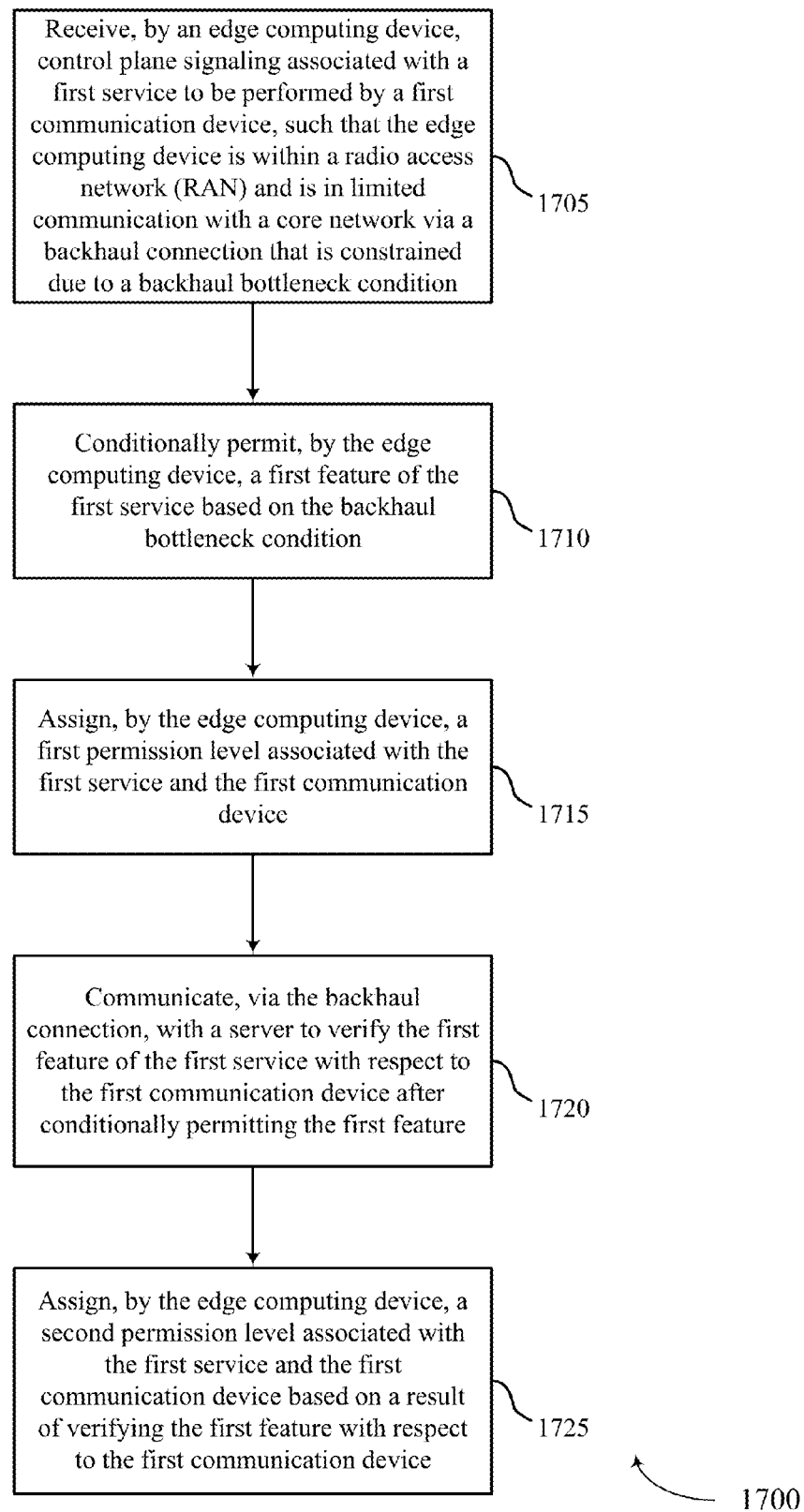

FIG. 17 shows a flowchart illustrating a method 1700 for mitigating constrained backhaul availability between a RAN and core network in accordance with various aspects of the present disclosure. The operations of method 1700 may be implemented by a wireless device 900, a wireless device 1000, an edge computing device 1250, or a base station 105, or their components as described with reference to FIGS. 1-13. For example, the operations of method 1700 may be performed by the backhaul manager module 910 or base station backhaul manager module 1310, as described with reference to FIGS. 9-13. The method 1700 may also incorporate aspects of methods 1400, 1500, and 1600 of FIGS. 14-16.

At block 1705, the edge computing device may receive control plane signaling associated with a first service to be performed by a first communication device, wherein the edge computing device is within a radio access network (RAN) and is in limited communication with a core network via a backhaul connection that is constrained due to a backhaul bottleneck condition as described with reference to FIGS. 2-8. In certain examples, the operations of block 1705 may be performed by the control plane signaling module 1005 as described with reference to FIG. 10.

At block 1710, the edge computing device may conditionally permit a first feature of the first service based at least in part on the backhaul bottleneck condition as described with reference to FIGS. 2-8. In certain examples, the operations of block 1710 may be performed by the permission manager module 1010 as described with reference to FIG. 10.

At block 1715, the edge computing device may assign a first permission level associated with the first service and the first communication device as described with reference to FIGS. 2-8. In certain examples, the operations of block 1715 may be performed by the permission manager module 1010 as described with reference to FIG. 10.

At block 1720, the edge computing device may communicate, via the backhaul connection, with a server to verify the first feature of the first service with respect to the first communication device after conditionally permitting the first feature as described with reference to FIGS. 2-8. In certain examples, the operations of block 1720 may be performed by the backhaul manager submodule 1110 as described with reference to FIG. 11.

At block 1725, the edge computing device may assign a second permission level associated with the first service and the first communication device based at least in part on a result of verifying the first feature with respect to the first communication device as described with reference to FIGS. 2-8. In certain examples, the operations of block 1725 may be performed by the permission manager module 1010 as described with reference to FIG. 10.

Figure 18:
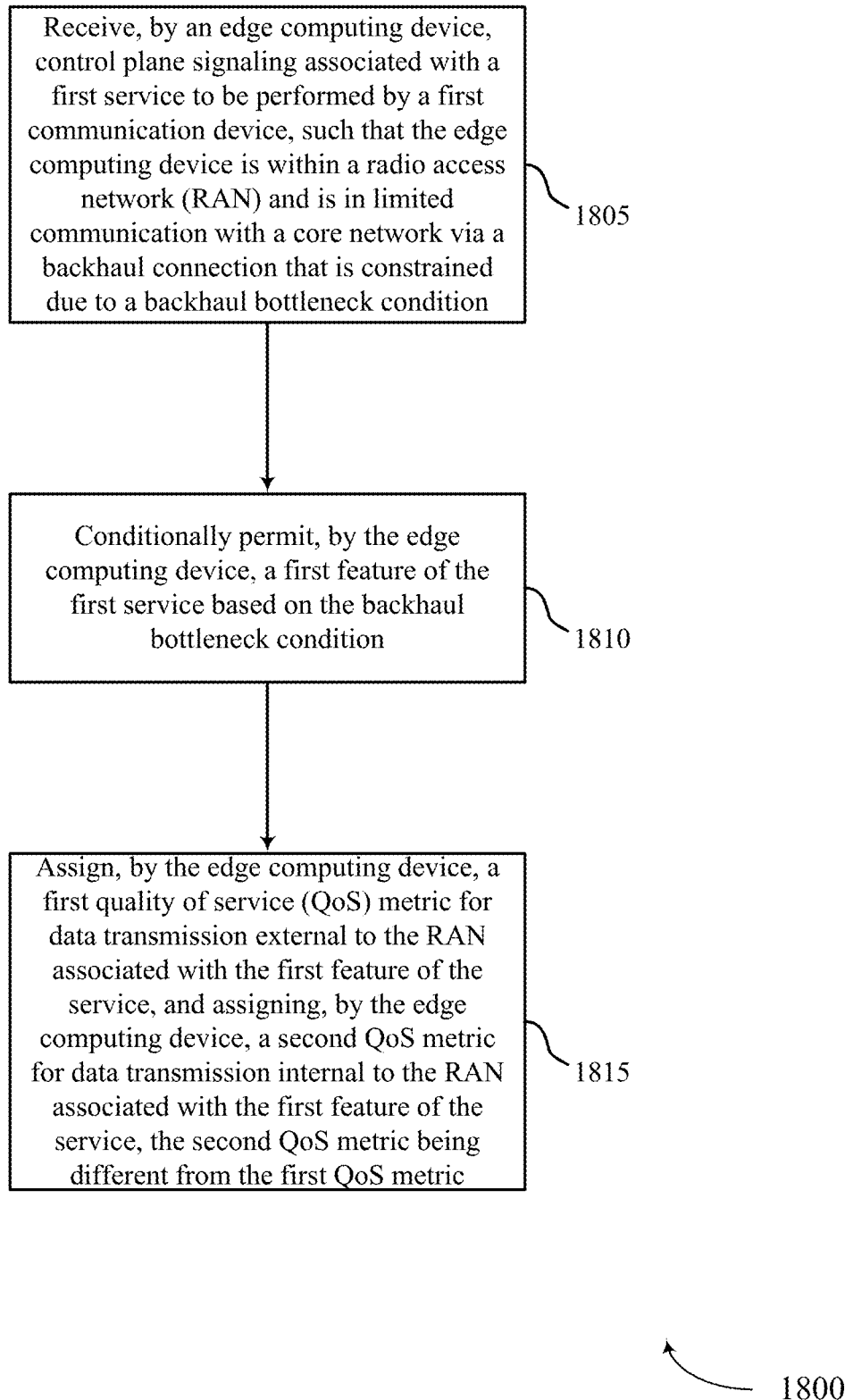

FIG. 18 shows a flowchart illustrating a method 1800 for mitigating constrained backhaul availability between a RAN and core network in accordance with various aspects of the present disclosure. The operations of method 1800 may be implemented by a wireless device 900, a wireless device 1000, an edge computing device 1250, or a base station 105, or their components as described with reference to FIGS. 1-13. For example, the operations of method 1800 may be performed by the backhaul manager module 910 or base station backhaul manager module 1310, as described with reference to FIGS. 9-13. The method 1800 may also incorporate aspects of methods 1400, 1500, 1600, and 1700 of FIGS. 14-17.

At block 1805, the edge computing device may receive control plane signaling associated with a first service to be performed by a first communication device, wherein the edge computing device is within a radio access network (RAN) and is in limited communication with a core network via a backhaul connection that is constrained due to a backhaul bottleneck condition as described with reference to FIGS. 2-8. In certain examples, the operations of block 1805 may be performed by the control plane signaling module 1005 as described with reference to FIG. 10.

At block 1810, the edge computing device may conditionally permit a first feature of the first service based at least in part on the backhaul bottleneck condition as described with reference to FIGS. 2-8. In certain examples, the operations of block 1810 may be performed by the permission manager module 1010 as described with reference to FIG. 10.

At block 1815, the edge computing device may assign a first quality of service (QoS) metric for data transmission external to the RAN associated with the first feature of the service, and assigning, by the edge computing device, a second QoS metric for data transmission internal to the RAN associated with the first feature of the service, the second QoS metric being different from the first QoS metric as described with reference to FIGS. 2-8. In certain examples, the operations of block 1815 may be performed by the QoS manager module 1105 as described with reference to FIG. 11.

Figure 19:
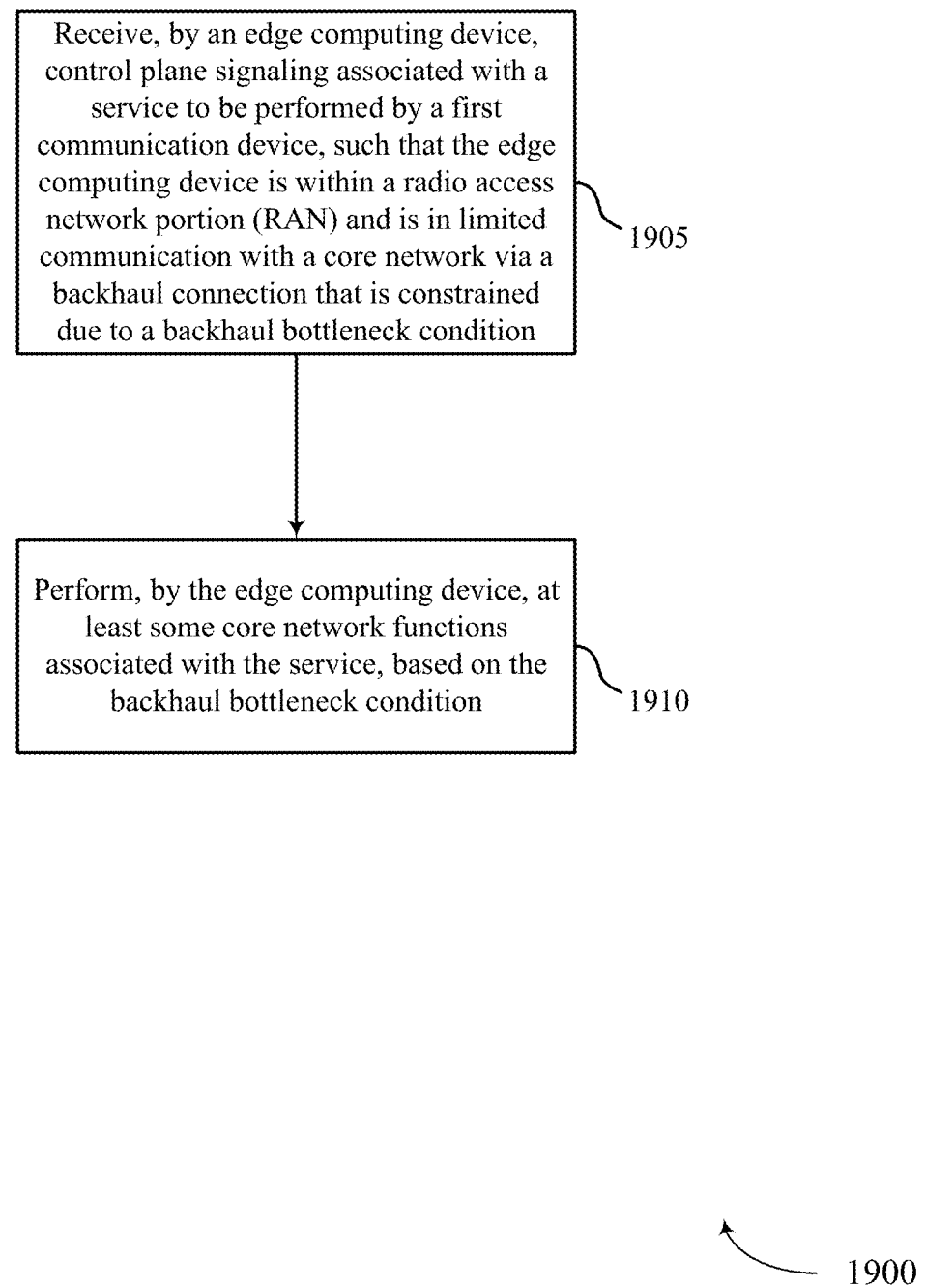

FIG. 19 shows a flowchart illustrating a method 1900 for mitigating constrained backhaul availability between a RAN and core network in accordance with various aspects of the present disclosure. The operations of method 1900 may be implemented by a wireless device 900, a wireless device 1000, an edge computing device 1250, or a base station 105, or their components as described with reference to FIGS. 1-13. For example, the operations of method 1900 may be performed by the backhaul manager module 910 or base station backhaul manager module 1310, as described with reference to FIGS. 9-13. The method 1900 may also incorporate aspects of methods 1400, 1500, 1600, 1700, and 1800 of FIGS. 14-18.

At block 1905, the edge computing device may receive control plane signaling associated with a service to be performed by a first communication device, wherein the edge computing device is within a radio access network portion (RAN) and is in limited communication with a core network via a backhaul connection that is constrained due to a backhaul bottleneck condition as described with reference to FIGS. 2-8. In certain examples, the operations of block 1905 may be performed by the control plane signaling module 1005 as described with reference to FIG. 10.

At block 1910, the edge computing device may perform at least some core network control plane functions associated with the service, based at least in part on the backhaul bottleneck condition as described with reference to FIGS. 2-8. In certain examples, the operations of block 1910 may be performed by the core network manager module 1115 as described with reference to FIG. 11.

Figure 20:
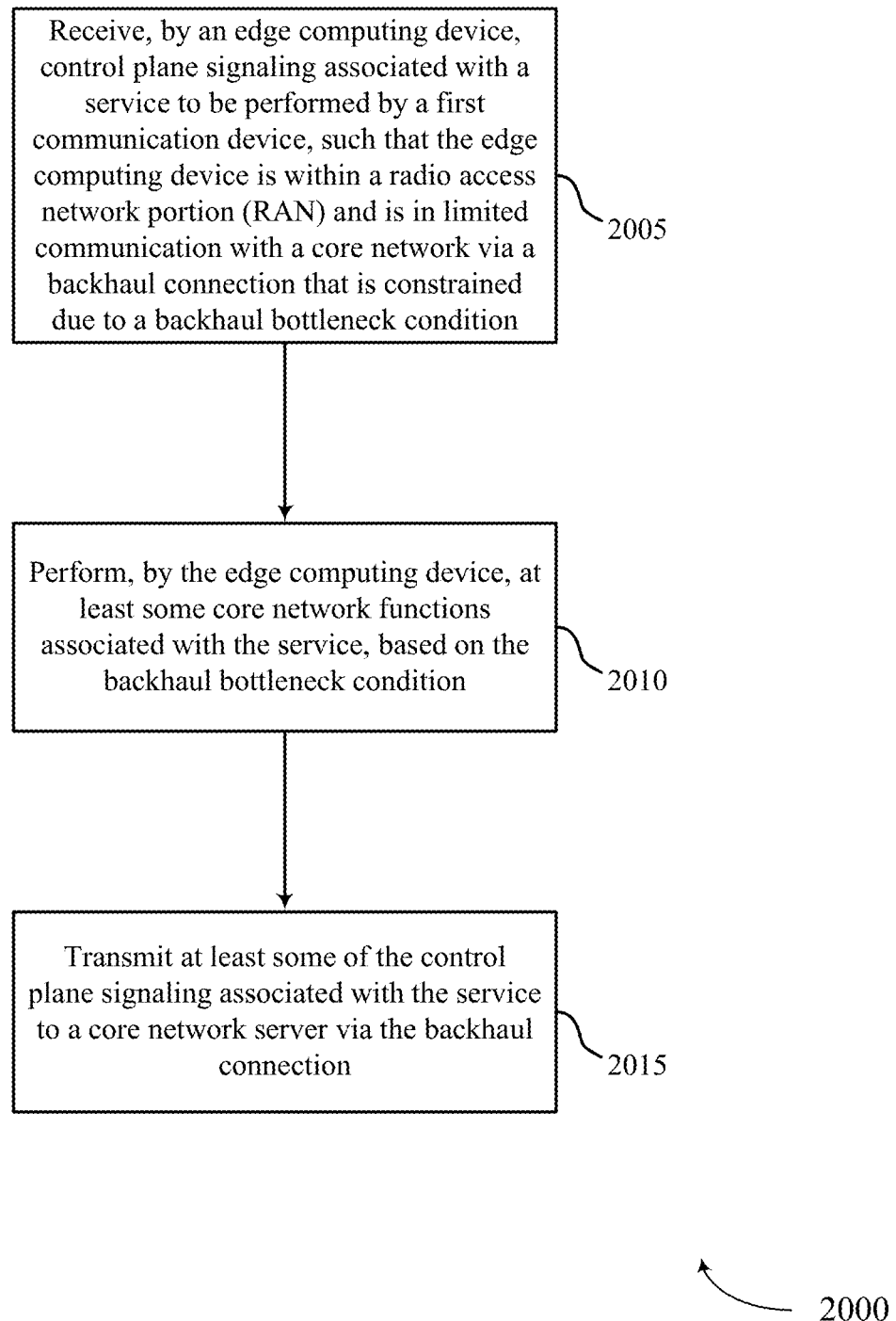

FIG. 20 shows a flowchart illustrating a method 2000 for mitigating constrained backhaul availability between a RAN and core network in accordance with various aspects of the present disclosure. The operations of method 2000 may be implemented by a wireless device 900, a wireless device 1000, an edge computing device 1250, or a base station 105, or their components as described with reference to FIGS. 1-13. For example, the operations of method 2000 may be performed by the backhaul manager module 910 or base station backhaul manager module 1310, as described with reference to FIGS. 9-13. The method 2000 may also incorporate aspects of methods 1400, 1500, 1600, 1700, 1800, and 1900 of FIGS. 14-19.

At block 2005, the edge computing device may receive control plane signaling associated with a service to be performed by a first communication device, wherein the edge computing device is within a radio access network portion (RAN) and is in limited communication with a core network via a backhaul connection that is constrained due to a backhaul bottleneck condition as described with reference to FIGS. 2-8. In certain examples, the operations of block 2005 may be performed by the control plane signaling module 1005 as described with reference to FIG. 10.

At block 2010, the edge computing device may perform at least some core network control plane functions associated with the service, based at least in part on the backhaul bottleneck condition as described with reference to FIGS. 2-8. In certain examples, the operations of block 2010 may be performed by the core network manager module 1115 as described with reference to FIG. 11.

At block 2015, the edge computing device may transmit at least some of the control plane signaling associated with the service to a core network server via the backhaul connection as described with reference to FIGS. 2-8. In certain examples, the operations of block 2015 may be performed by the control plane signaling module 1005 as described with reference to FIG. 10.

Figure 21:
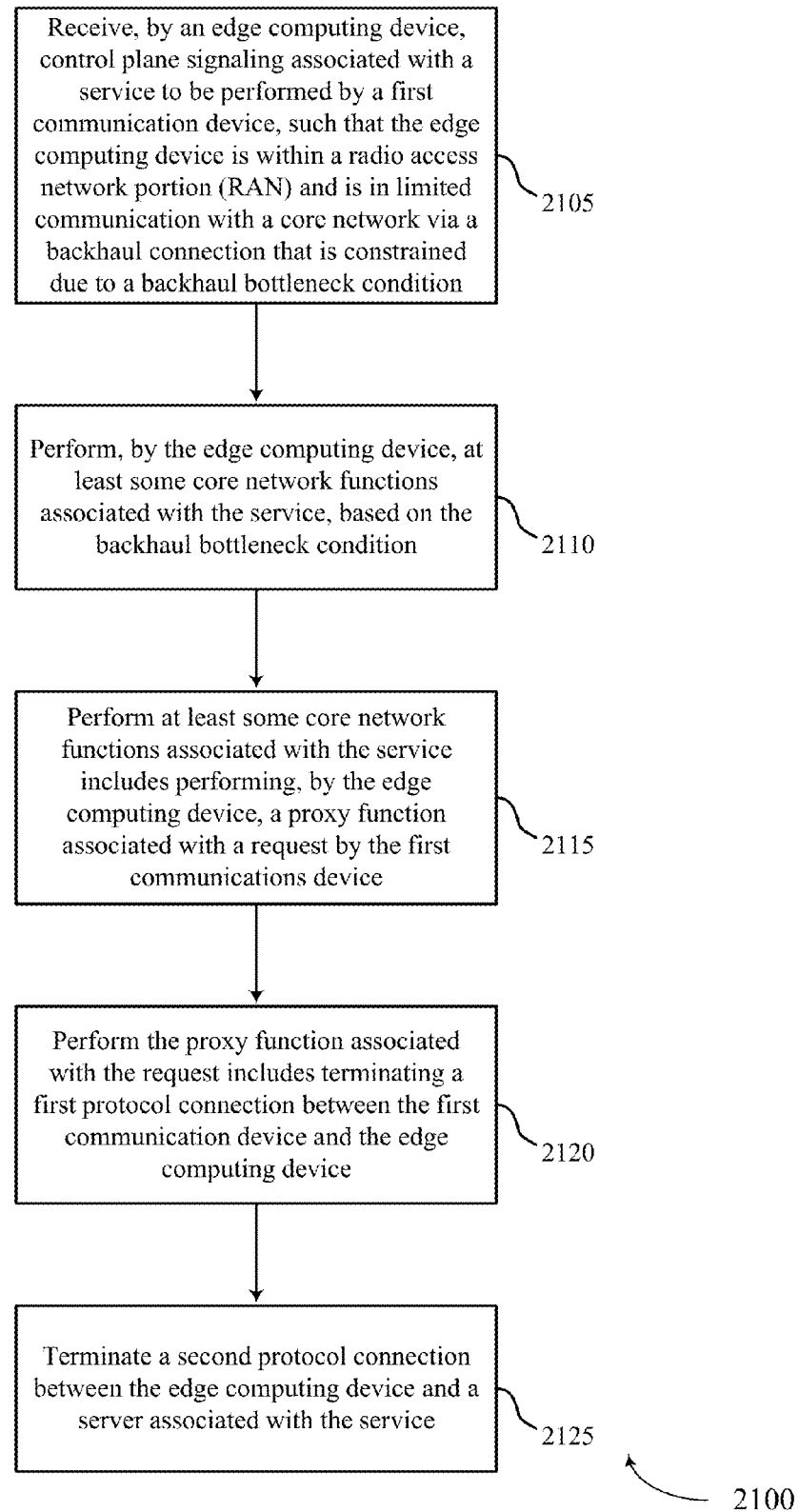

FIG. 21 shows a flowchart illustrating a method 2100 for mitigating constrained backhaul availability between a RAN and core network in accordance with various aspects of the present disclosure. The operations of method 2100 may be implemented by a wireless device 900, a wireless device 1000, an edge computing device 1250, or a base station 105, or their components as described with reference to FIGS. 1-13. For example, the operations of method 2100 may be performed by the backhaul manager module 910 or base station backhaul manager module 1310, as described with reference to FIGS. 9-13. The method 2100 may also incorporate aspects of methods 1400, 1500, 1600, 1700, 1800, 1900, and 2000 of FIGS. 14-20.

At block 2105, the edge computing device may receive control plane signaling associated with a service to be performed by a first communication device, wherein the edge computing device is within a radio access network portion (RAN) and is in limited communication with a core network via a backhaul connection that is constrained due to a backhaul bottleneck condition as described with reference to FIGS. 2-8. In certain examples, the operations of block 2105 may be performed by the control plane signaling module 1005 as described with reference to FIG. 10.

At block 2110, the edge computing device may perform at least some core network control plane functions associated with the service, based at least in part on the backhaul bottleneck condition as described with reference to FIGS. 2-8. In certain examples, the operations of block 2110 may be performed by the core network manager module 1115 as described with reference to FIG. 11.

At block 2115, the edge computing device may perform at least some core network control plane functions associated with the service comprises performing, by the edge computing device, a proxy function associated with a request by the first communications device as described with reference to FIGS. 2-8. In certain examples, the operations of block 2115 may be performed by the core network manager module 1115 as described with reference to FIG. 11.

At block 2120, the edge computing device may perform the proxy function associated with the request comprises terminating a first protocol connection between the first communication device and the edge computing device as described with reference to FIGS. 2-8. In certain examples, the operations of block 2120 may be performed by the control plane signaling module 1005 as described with reference to FIG. 10.

At block 2125, the edge computing device may terminate a second protocol connection between the edge computing device and a server associated with the service as described with reference to FIGS. 2-8. In certain examples, the operations of block 2125 may be performed by the control plane signaling module 1005 as described with reference to FIG. 10.

Thus, methods 1400, 1500, 1600, 1700, 1800, 1900, 2000, and 2100 may provide for mitigating constrained backhaul availability between a RAN and core network. It should be noted that methods 1400, 1500, 1600, 1700, 1800, 1900, 2000, and 2100 describe possible implementation, and that the operations and the steps may be rearranged or otherwise modified such that other implementations are possible. In some examples, aspects from two or more of the methods 1400, 1500, 1600, 1700, 1800, 1900, 2000, and 2100 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
receiving, by a computing device, control plane signaling associated with a first service to be performed by a first communication device, wherein the computing device is within a radio access network (RAN) and is in limited communication with a core network via a backhaul connection that is constrained due to a backhaul bottleneck condition;
conditionally permitting, by the computing device, a first feature of the first service based at least in part on an existence of the backhaul bottleneck condition
assigning, by the computing device, a first permission level associated with the first service and the first communication device, the assigning the first permission level being based at least in part on the conditionally permitting the first feature; and
communicating, via the backhaul connection, with a server to verify the first feature of the first service with respect to the first communication device after conditionally permitting the first feature.

2. The method of claim 1, wherein conditionally permitting the first feature of the first service comprises:
conditionally permitting the first feature of the first service without verifying, via the backhaul connection, the first feature with respect to the first communication device.

3. The method of claim 1, further comprising:
assigning, by the computing device, a first quality of service (QoS) metric for data transmission external to the RAN associated with the first feature of the first service.

4. The method of claim 1, further comprising:
delaying, by the computing device, data transmission external to the RAN based at least in part on a predefined amount of data buffered by the computing device or a predefined time period for transmission.

5. The method of claim 1, further comprising:
receiving, by the computing device, control plane signaling associated with the first service to be performed by a second communication device; and
transmitting, by the computing device, a request to the first communication device to conditionally permit the first feature of the first service to be performed by the second communication device.

6. The method of claim 1, further comprising:
establishing a delay tolerant bearer channel using the backhaul connection for data transmission external to the RAN.

7. The method of claim 1, further comprising:
receiving, by the computing device, control plane signaling associated with a second service to be performed by a second communication device;
conditionally permitting, by the computing device, a second feature of the second service without verifying the second feature with respect to the second communication device via the backhaul connection; and
establishing an aggregate bearer channel using the backhaul connection for data transmission external to the RAN associated with the first service and the second service.

8. The method of claim 7, further comprising:
initiating data transmission via the aggregate bearer channel based at least in part on detection of data for transmission by both the first communication device and the second communication device.

9. The method of claim 1, further comprising:
assigning, by the computing device, a second permission level associated with the first service and the first communication device based at least in part on a result of verifying the first feature with respect to the first communication device, the second permission level being different from the first permission level.

10. The method of claim 1, further comprising:
assigning, by the computing device, a first quality of service (QoS) metric for data transmission external to the RAN associated with the first feature of the service, and
assigning, by the computing device, a second quality of service (QoS) metric for data transmission internal to the RAN associated with the first feature of the service, the second QoS metric being different from the first QoS metric.

11. The method of claim 10, wherein the first QoS metric is defined by a best-effort delivery attempt to transmit a data packet.

12. The method of claim 10, further comprising:
transmitting a transmission canceled message to the first communication device associated with the first QoS metric based at least in part on non-transmission of a data packet after a time period.

13. The method of claim 1, wherein the backhaul bottleneck condition is a condition relating to non-contiguous availability of the backhaul network connection such that connectivity provided to the RAN via the backhaul connection is purposefully disconnected.

14. The method of claim 1, wherein the first service is a local content hosting service and the first feature is data transmission associated with a local content host server.

15. An apparatus for wireless communication, comprising:
a processor;
memory in electronic communication with the processor; and
instructions stored in the memory and operable, when executed by the processor, to cause the apparatus to:
receive control plane signaling associated with a first service to be performed by a first communication device, wherein the apparatus is within a radio access network (RAN) and is in limited communication with a core network via a backhaul connection that is constrained due to a backhaul bottleneck condition;
conditionally permit a first feature of the first service based at least in part on an existence of the backhaul bottleneck condition;
assign a first permission level associated with the first service and the first communication device, an assignment of the first permission level being based at least in part on conditionally permitting the first feature; and
communicate, via the backhaul connection, with a server to verify the first feature of the first service with respect to the first communication device after conditionally permitting the first feature.

16. The apparatus of claim 15, wherein the instructions are operable to cause the apparatus to:
conditionally permit the first feature of the first service without verifying, via the backhaul connection, the first feature with respect to the first communication device.

17. The apparatus of claim 15, wherein the instructions are operable to cause the apparatus to:
assign a first quality of service (QoS) metric for data transmission external to the RAN associated with the first feature of the first service.

18. The apparatus of claim 15, wherein the instructions are operable to cause the apparatus to:
delay data transmission external to the RAN based at least in part on a predefined amount of data buffered by the apparatus or a predefined time period for transmission.

19. The apparatus of claim 15, wherein the instructions are operable to cause the apparatus to:
receive control plane signaling associated with the first service to be performed by a second communication device; and
transmit a request to the first communication device to conditionally permit the first feature of the first service to be performed by the second communication device.

20. The apparatus of claim 15, wherein the instructions are operable to cause the apparatus to:
establish a delay tolerant bearer channel using the backhaul connection for data transmission external to the RAN.

21. The apparatus of claim 15, wherein the instructions are operable to cause the apparatus to:
receive control plane signaling associated with a second service to be performed by a second communication device;
conditionally permit a second feature of the second service without verifying the second feature with respect to the second communication device via the backhaul connection; and
establish an aggregate bearer channel using the backhaul connection for data transmission external to the RAN associated with the first service and the second service.

22. The apparatus of claim 21, wherein the instructions are operable to cause the apparatus to:
initiate data transmission via the aggregate bearer channel based at least in part on detection of data for transmission by both the first communication device and the second communication device.

23. The apparatus of claim 15, wherein the instructions are operable to cause the apparatus to:
assign a second permission level associated with the first service and the first communication device based at least in part on a result of verifying the first feature with respect to the first communication device, the second permission level being different from the first permission level.

24. The apparatus of claim 15, wherein the instructions are operable to cause the apparatus to:
assign a first quality of service (QoS) metric for data transmission external to the RAN associated with the first feature of the service, and
assign a second quality of service (QoS) metric for data transmission internal to the RAN associated with the first feature of the service, the second QoS metric being different from the first QoS metric.

25. The apparatus of claim 24, wherein the first QoS metric is defined by a best-effort delivery attempt to transmit a data packet.

26. The method of claim 24, wherein the instructions are operable to cause the apparatus to:
transmit a transmission canceled message to the first communication device associated with the first QoS metric based at least in part on non-transmission of a data packet after a time period.

27. The apparatus of claim 15, wherein the backhaul bottleneck condition is a condition relating to non-contiguous availability of the backhaul network connection such that connectivity provided to the RAN via the backhaul connection is purposefully disconnected.

28. The apparatus of claim 15, wherein the first service is a local content hosting service and the first feature is data transmission associated with a local content host server.

29. An apparatus for wireless communication, comprising:
means for receiving control plane signaling associated with a first service to be performed by a first communication device, wherein the computing device is within a radio access network (RAN) and is in limited communication with a core network via a backhaul connection that is constrained due to a backhaul bottleneck condition;
means for conditionally permitting a first feature of the first service based at least in part on an existence of the backhaul bottleneck condition
means for assigning a first permission level associated with the first service and the first communication device, an assignment of the first permission level being based at least in part on conditionally permitting the first feature; and
means for communicating, via the backhaul connection, with a server to verify the first feature of the first service with respect to the first communication device after conditionally permitting the first feature.

30. A computer program product, comprising:
a tangible computer readable storage device comprising computer-readable program code stored thereon, the computer-readable program code comprising:
computer readable program code configured to cause at least one processor to receive control plane signaling associated with a first service to be performed by a first communication device, wherein the apparatus is within a radio access network (RAN) and is in limited communication with a core network via a backhaul connection that is constrained due to a backhaul bottleneck condition;

computer readable program code configured to cause at least one processor to conditionally permit a first feature of the first service based at least in part on an existence of the backhaul bottleneck condition;

computer readable program code configured to cause at least one processor to assign a first permission level associated with the first service and the first communication device, an assignment of the first permission level being based at least in part on conditionally permitting the first feature; and computer readable program code configured to cause at least one processor to communicate, via the backhaul connection, with a server to verify the first feature of the first service with respect to the first communication device after conditionally permitting the first feature.

* * * * *